United States Patent
Yamazaki et al.

(10) Patent No.: US 10,313,660 B2
(45) Date of Patent: Jun. 4, 2019

(54) IMAGE PROCESSING APPARATUS, IMAGE PROCESSING METHOD, AND PROGRAM

(71) Applicant: SONY CORPORATION, Tokyo (JP)

(72) Inventors: Toshio Yamazaki, Tokyo (JP); Seiji Kobayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/361,940

(22) Filed: Nov. 28, 2016

(65) Prior Publication Data

US 2017/0078642 A1    Mar. 16, 2017

Related U.S. Application Data

(63) Continuation of application No. 12/906,367, filed on Oct. 18, 2010, now abandoned.

(30) Foreign Application Priority Data

Oct. 28, 2009 (JP) ................................. 2009-247931
Sep. 2, 2010 (JP) .................................. 2010-196486

(51) Int. Cl.
*H04N 13/264* (2018.01)
*H04N 13/324* (2018.01)
(Continued)

(52) U.S. Cl.
CPC ......... *H04N 13/261* (2018.05); *H04N 13/257* (2018.05); *H04N 13/264* (2018.05); *H04N 13/324* (2018.05); *H04N 13/337* (2018.05)

(58) Field of Classification Search
None
See application file for complete search history.

(56) References Cited

U.S. PATENT DOCUMENTS 5,717,415 A    2/1998    Iue et al.
5,808,664 A    9/1998    Yamashita et al.
(Continued)

FOREIGN PATENT DOCUMENTS

JP    05-68268 A    3/1993
JP    6-194602    7/1994
(Continued)

OTHER PUBLICATIONS

Dec. 11, 2014, JP communication issued for related JP application No. 2014-059902.

(Continued)

*Primary Examiner* — Frederick D Bailey
(74) *Attorney, Agent, or Firm* — Paratus Law Group, PLLC

(57) ABSTRACT

An image processing apparatus includes: an image input section through which a two-dimensional image signal is input; an image converting section which receives the image signal output from the image input section and generates and outputs a left eye image and a right eye image for realizing stereopsis; and an image output section which outputs the left eye image and the right eye image output from the image converting section. The image converting section extracts a spatial characteristic amount of the input image signal, generates at least one of the left eye image and the right eye image through an image conversion process in which the characteristic amount is applied, and performs the image conversion process of a different type according to a comparison result of distance information of a preset region unit in the input image signal and a predetermined threshold.

19 Claims, 25 Drawing Sheets

(51) Int. Cl.
*H04N 13/337* (2018.01)
*H04N 13/261* (2018.01)
*H04N 13/257* (2018.01)

(56) References Cited

U.S. PATENT DOCUMENTS

| | | |
|---|---|---|
| 6,445,833 B1 | 9/2002 | Murata et al. |
| 6,466,255 B1 | 10/2002 | Kagita et al. |
| 6,553,184 B1 | 4/2003 | Ando et al. |
| 6,584,219 B1 | 6/2003 | Yamashita et al. |
| 7,262,767 B2 | 8/2007 | Yamada |
| 2002/0005857 A1 | 1/2002 | Kasahara et al. |
| 2003/0020708 A1 | 1/2003 | Redert |
| 2003/0063383 A1 | 4/2003 | Costales |
| 2003/0107686 A1 | 6/2003 | Sato et al. |
| 2004/0008893 A1 | 1/2004 | Itoi et al. |
| 2004/0190023 A1 | 9/2004 | Aoyama |
| 2004/0252756 A1 | 12/2004 | Smith et al. |
| 2005/0012814 A1 | 1/2005 | Shen |
| 2005/0052557 A1 | 3/2005 | Kusaka et al. |
| 2006/0082646 A1 | 4/2006 | Abe et al. |
| 2009/0002517 A1 | 1/2009 | Yokomitsu et al. |
| 2009/0027224 A1 | 1/2009 | Sugamura |
| 2009/0033753 A1* | 2/2009 | Sato .................. G01S 17/89 348/217.1 |
| 2010/0026787 A1 | 2/2010 | Yasuda et al. |
| 2010/0123839 A1 | 5/2010 | Lu |
| 2010/0171697 A1 | 7/2010 | Son et al. |

FOREIGN PATENT DOCUMENTS

| | | |
|---|---|---|
| JP | 8-30806 | 2/1996 |
| JP | 9-107562 | 4/1997 |
| JP | 09-331550 A | 12/1997 |
| JP | 10-051811 | 2/1998 |
| JP | 10-051812 | 2/1998 |
| JP | 2000-209614 | 7/2000 |
| JP | 2004-522382 A | 7/2004 |
| JP | 2005-151534 | 6/2005 |
| WO | WO2004/019621 A1 | 3/2004 |

OTHER PUBLICATIONS

Dec. 24, 2013, JP communication issued for related JP application No. 2010-196486.

* cited by examiner

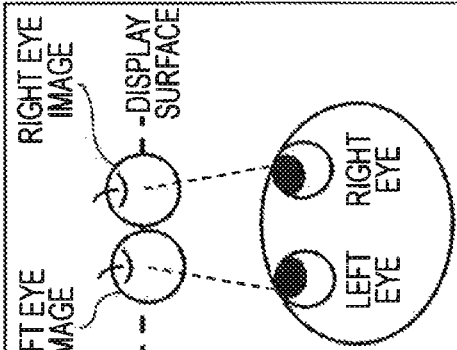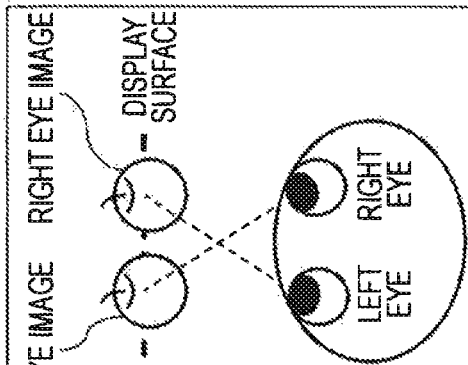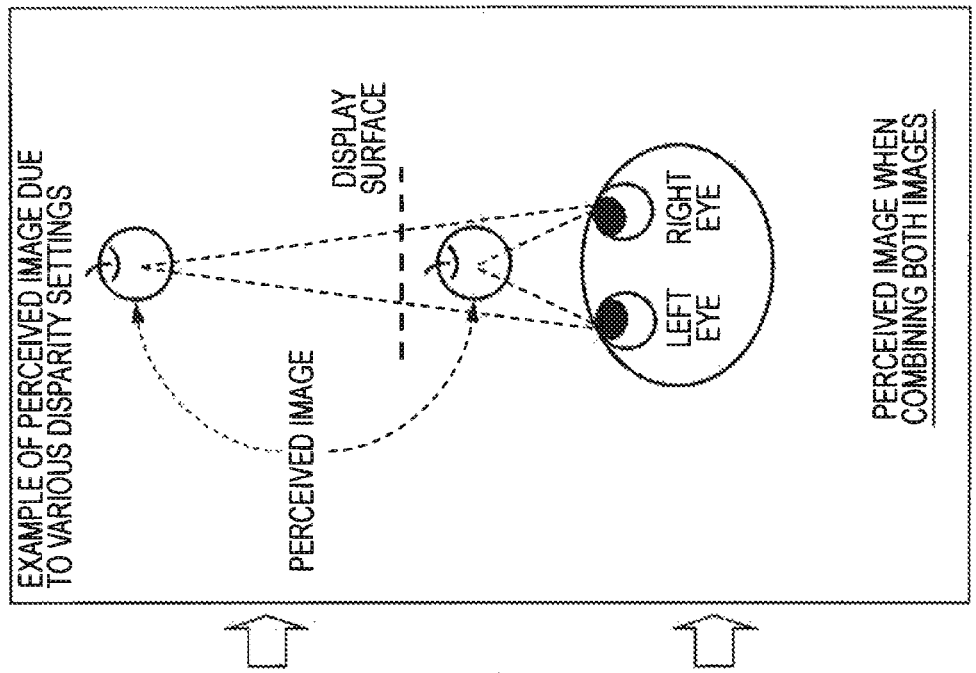

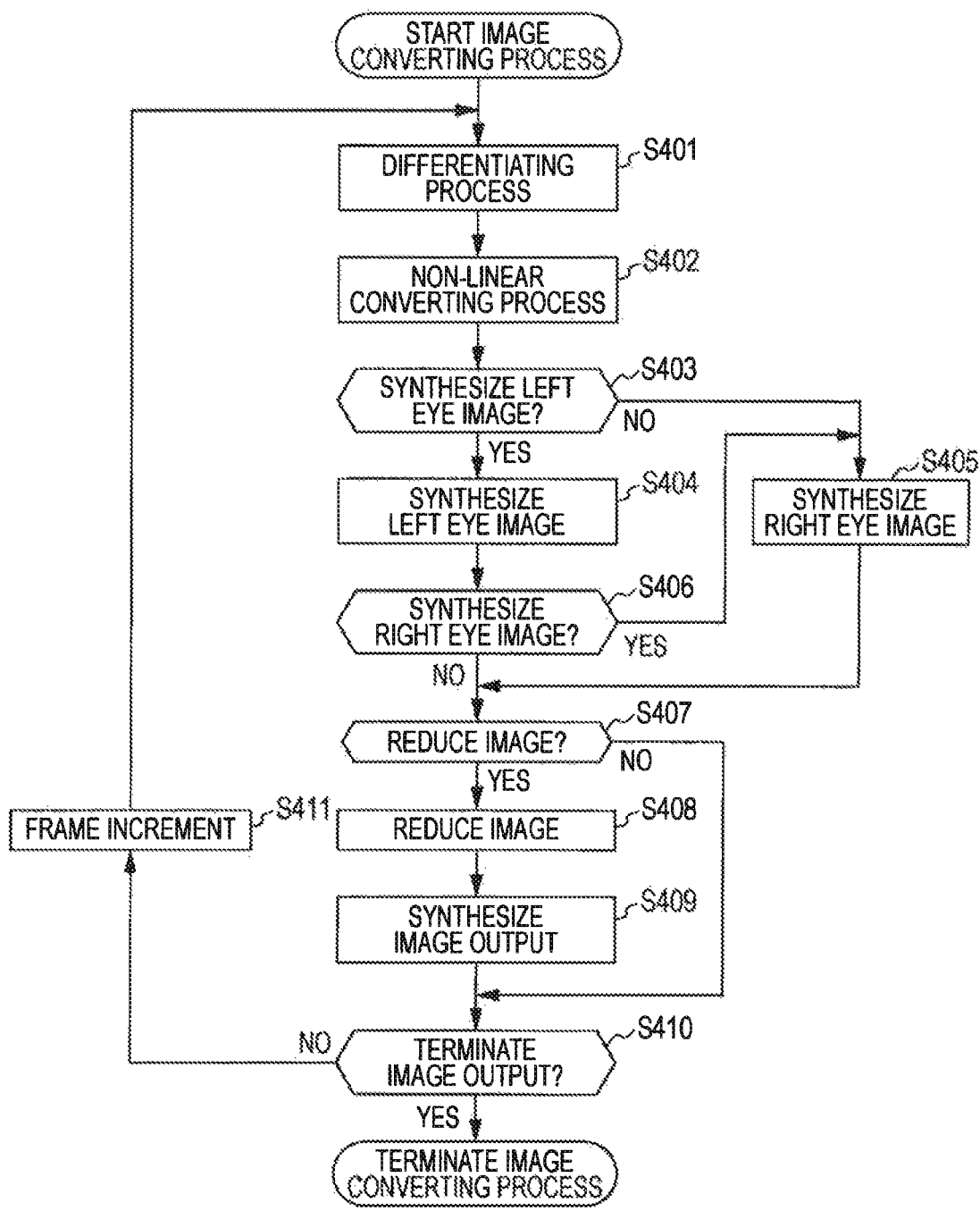

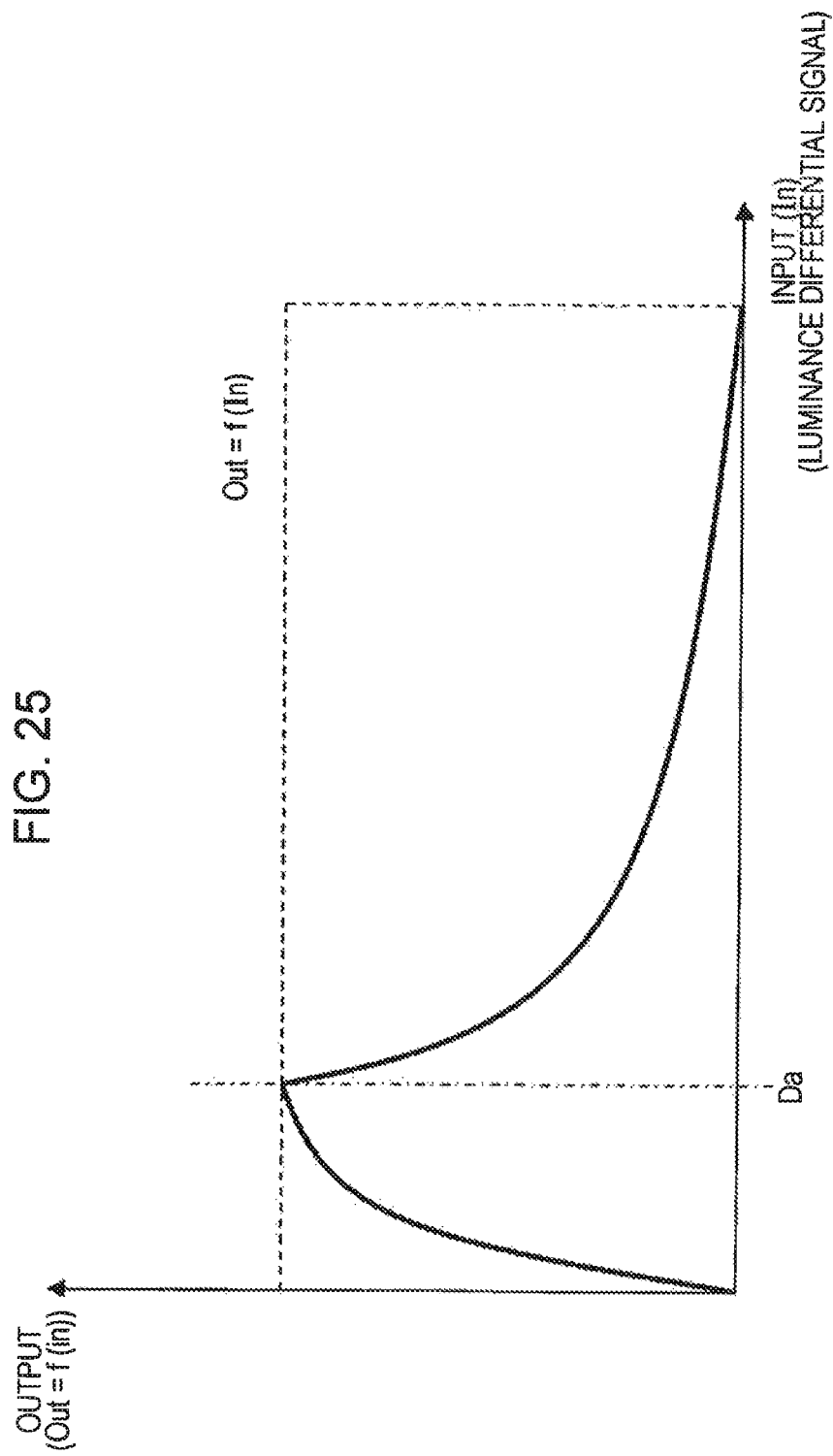

IMAGE PROCESSING APPARATUS, IMAGE PROCESSING METHOD, AND PROGRAM

CROSS-REFERENCE TO PRIOR APPLICATION

This application is a continuation of U.S. patent application Ser. No. 12/906,367 (filed on Oct. 18, 2010) which claims priority to Japanese Patent Application Nos. 2010-196486 (filed on Sep. 2, 2010) and 2009-247931 (filed on Oct. 28, 2009), which are all hereby incorporated by reference in their entirety.

BACKGROUND OF THE INVENTION

1. Field of the Invention

The present invention relates to an image processing apparatus, an image processing method and a program, and more particularly, to an image processing apparatus, an image processing method and a program which performs image conversion for a two-dimensional image to generate a binocular disparity image corresponding to stereopsis.

2. Description of the Related Art

In the related art, a variety of proposals has been made for apparatuses and methods which convert a two-dimensional image into a binocular disparity image corresponding to stereopsis. The binocular disparity image generated on the basis of the two-dimensional image includes a pair of a left eye image, which is observed by the left eye, and a right eye image, which is observed by the right eye. As the binocular disparity image including the pair of the left eye image and the right eye image is displayed through a display apparatus which can separate the binocular disparity image into the left eye image and the right eye image to respectively provide the separated images to the left eye and the right eye of an observer, the observer can perceive the images as a three-dimensional image.

Such an image generation or display process is disclosed in the following related art techniques.

For example, Japanese Unexamined Patent Application Publication No. 9-107562 discloses an image processing configuration for a dynamic image moving horizontally. Specifically, according to this configuration, an original image is output as one of a left eye image and a right eye image, and an image delayed in a field unit is output as the other thereof. Through such an image output control, an object moving in the horizontal direction is perceived as being in front of the background.

Further, Japanese Unexamined Patent Application Publication No. 8-30806 discloses an apparatus in which a left eye image and a right eye image are shifted from each other by a preset amount in the horizontal direction for a still image or an image having a small movement and thus the image is perceived as floated.

Further, Japanese Unexamined Patent Application Publication No. 10-51812 discloses a technique in which an image is divided into a plurality of disparity calculation regions, a pseudo-depth is calculated from a characteristic amount of the image in each region, and a left eye image and a right eye image are horizontally shifted in the opposite directions on the basis of the depth.

Further, Japanese Unexamined Patent Application Publication No. 2000-209614 discloses a technique similar to Japanese Unexamined Patent Application Publication No, 10-51812, which while changing, on the basis of a delay amount calculated from a characteristic amount of an image, the horizontal delay amount of a left eye image and a right eye image, limits the horizontal delay amount to prevent a retinal image difference from occurring any more than is necessary, thereby preventing a degree of fatigue of the eyes.

Further, Japanese Unexamined Patent Application Publication No. 2005-151534 discloses a technique in which characteristic amounts of upper and lower portions of an image are calculated, and the synthesis ratio of a plurality of scene structures indicating preset depth information is adjusted, to thereby express the image as a combination having a simplified structure.

However, the related art techniques as described above have the following problems.

In the image conversion apparatus as disclosed in Japanese Unexamined Patent Application Publication No. 9-107562, preferable stereopsis can be provided for only an object moving at a constant speed in the horizontal direction. In an image including a plurality of moving objects or complex movements, the binocular disparity is not correctly set, and thus the objects are arranged in unnatural positions or the retinal image difference becomes excessively large. Thus, stereopsis may not be formed.

Further, the image conversion apparatus as disclosed in Japanese Unexamined Patent Application Publication No. 8-30806 provides only the shift of the entire screen for the still image or the image having a small movement, but has great difficulty in expressing the anteroposterior relation of the objects in the image.

In the image conversion apparatuses as disclosed in Japanese Unexamined Patent Application Publication Nos. 10-51812 and 2000-209614, the pseudo-depth is estimated from the characteristic amounts of the image, but since the estimation is based on such an assumption that the sharpness, luminance and saturation of the object in the front of the screen are high, the estimation is not necessarily performed in a correct manner. Thus, an incorrect retinal image difference is given to the object having the incorrect depth estimation, thereby resulting in the arrangement in an incorrect position.

The image conversion apparatus as disclosed in Japanese Unexamined Patent Application Publication No. 2005-151534 is configured to allow the structure of the image to be adapted for a simple and limitative structure and suppresses generation of unnatural depth. However, all the related art techniques as described above have the following common problem. That is, a relatively large retinal image difference is generated in the generated binocular disparity image, and the binocular disparity image is three dimensionally displayed using a three-dimensional display apparatus. In general, such a three-dimensional display apparatus is used that the image is observed using special glasses for stereopsis, such as a passive eyeglass-type in which an image is divided through a polarization filter, or a color filter to be observed by the left eye and the right eye or an active eyeglass type in which an image is temporally divided from side to side through a liquid crystal shutter.

When viewing the binocular disparity image having the large retinal image difference, an observer can perceive the stereoscopic effect depending on the retinal image difference with such glasses for stereopsis. However, when viewing the screen without the glasses, the observer comes to view double images in which the left eye image and the right eye image overlap with each other by a large amount and does not view the images as a normal two-dimensional image. That is, the image converted through these related art image conversion apparatuses can be viewed only with the glasses.

Further, the large retinal image difference may affect fatigue of the observer. For example, Japanese Unexamined Patent Application Publication No. 6-194602 discloses that in a case where the left eye image and the right eye image are each shifted by a large amount, a discrepancy occurs between control of the angle of convergence and adjustment of the lens in a view direction in the real world, so that the discrepancy leads to fatigue in stereopsis using the binocular disparity.

Further, in the image conversion apparatuses as disclosed in Japanese Unexamined Patent Application Publication Nos. 10-51812, 2000-209614 and 2005-151534, the pseudo-depth is estimated from the image, but it is difficult to detect a detailed depth from a single image. For example, in the case of minute structures such as branches of trees, electric cables or hairs, the depth estimation is not easy. Thus, it is difficult to obtain the stereoscopic effect for minute objects.

SUMMARY OF THE INVENTION

Accordingly, it is desirable to provide an image processing apparatus, an image processing method and a program which can suppress generation of an incorrect stereoscopic effect due to an incorrect depth estimation to restore an original image or an image close to the original image when a left eye image and a right eye image are synthesized. That is, the present invention provides an image processing apparatus, an image processing method and a program in which an observer can view a normal two-dimensional image without glasses for stereopsis and which can generate and provide a binocular disparity image, reducing fatigue for the observer.

According to an embodiment of the invention, there is provided an image processing apparatus including: an image input section through which a two-dimensional image signal is input; an image converting section which receives the image signal output from the image input section and generates and outputs a left eye image and a right eye image for realizing stereopsis; and an image output section which outputs the left eye image and the right eye image output from the image converting section, wherein the image converting section is configured to extract a spatial characteristic amount of the input image signal and to generate at least one of the left eye image and the right eye image through an image conversion process in which the characteristic amount is applied, and performs the image conversion process of a different type according to the comparison result of distance information of a preset region unit in the input image signal and a predetermined threshold.

Further, in the image processing apparatus according to an embodiment of the invention, the image converting section is configured to extract a luminance differential signal of the input image signal, to set the luminance differential signal as the characteristic amount, to generate one of a converted signal obtained by adding the characteristic amount to the input image signal or a converted signal obtained by subtracting the characteristic amount from the input image signal as one of the left eye image and the right eye image, and to output a non-converted signal from the input image signal without being processed as the other one of the left eye image and the right eye image.

Further, in the image processing apparatus according to an embodiment of the invention, the image converting section is configured to extract a luminance differential signal of the input image signal, to set the luminance differential signal as the characteristic amount, to generate a signal obtained by adding the characteristic amount to the input image signal and a signal obtained by subtracting the characteristic amount from the input image signal, and to generate a set of the two signals as a set of the left eye image and the right eye image.

Further, in the image processing apparatus according to an embodiment of the invention, the image converting section is configured to extract a luminance differential signal of the input image signal, to set a signal generated by non-linearly converting the luminance differential signal as the characteristic amount, to generate a signal obtained by adding the characteristic amount to the input image signal or a signal obtained by subtracting the characteristic amount from the input image signal, and to generate one of the generated signals as the left eye image or the right eye image.

Further, in the image processing apparatus according to an embodiment of the invention, the image converting section is configured to switch the process of generating the left eye image or the right eye image by adding the characteristic amount to the input image signal and the process of generating the left eye image or the right eye image by subtracting the characteristic amount from the input image signal, according to the comparison result of the distance information of the preset region unit in the input image signal and the predetermined threshold.

Further, in the image processing apparatus according to an embodiment of the invention, the image converting section is configured to generate the left eye image as a signal obtained by subtracting the characteristic amount from the input image signal and generate the right eye image as a signal obtained by adding the characteristic amount to the input image signal in a case where the relation between the distance of the preset region unit in the input image signal and the predetermined threshold satisfies "distance≤threshold", and to generate the left eye image as the signal obtained by adding the characteristic amount to the input image signal and generate the right eye image as the signal obtained by subtracting the characteristic amount from the input image signal in a case where the relation satisfies "distance>threshold".

Further, in the image processing apparatus according to an embodiment of the invention, the image converting section switches an addition process and a subtraction process between the input image signal and the characteristic amount according to the distance information of the preset region unit and generates the left eye image and the right eye image of which the perception range is enlarged to antero-posterior regions of a display section.

Further, in the image processing apparatus according to an embodiment of the invention, the image converting section is configured to generate the left eye image and the right eye image for each frame forming a moving image.

Further, in the image processing apparatus according to an embodiment of the invention, the apparatus further includes the image output section which outputs the left eye image and the right eye image generated by the image converting section, wherein the image output section is configured to alternately output the left eye image and the right eye image generated by the image converting section at a speed two times faster than an input image frame rate.

Further, in the image processing apparatus according to an embodiment of the invention, the image converting section is configured to alternately generate only either one of the left eye image or the right eye image for each frame forming a moving image.

Further, in the image processing apparatus according to an embodiment of the invention, the image converting section is configured to generate the left eye image and the right eye image for each frame forming a moving image and to generate a binocular disparity image alternately including line data forming the generated left eye image and right eye image.

Further, in the image processing apparatus according to an embodiment of the invention, the image converting section is configured to generate the left eye image and the right eye image so that an addition signal of the generated left eye image and right eye image is set to be equivalent or approximately equivalent to the input signal.

Further, in the image processing apparatus according to an embodiment of the invention, the apparatus further includes an image display section which displays the images generated by the image converting section.

Further, in the image processing apparatus according to an embodiment of the invention, the image display section is configured to perform a three-dimensional display process using a time-division type in which the left eye image and the right eye image are alternately output.

Further, in the image processing apparatus according to an embodiment of the invention, the image display section is configured to perform display switching so that an output switching timing of the left eye image and the right eye image is synchronized with the shutter switching of left and right glasses sections of glasses which an image observer wears, when performing the three-dimensional display process using the time-division type in which the left eye image and the right eye image are alternately output.

Further, in the image processing apparatus according to an embodiment of the invention, the image display section has a configuration in which a polarizing filter which is set so that a polarization direction becomes different for every horizontal line is installed on a front surface of the display section, and is configured to display a binocular disparity image alternately including line data forming the left eye image and the right eye image generated by the image converting section.

Further, according to an embodiment of the invention, there is provided an image processing apparatus including; an image input section through which a two-dimensional image signal is input; an image converting section which receives the image signal output from the image input section and generates and outputs a left eye image or a right eye image for realizing stereopsis; and an image output section which outputs the left eye image and the right eye image output from the image converting section, wherein the image converting section is configured to generate the left eye image and the right eye image so that an addition signal of the generated left eye image and right eye image is set to be equivalent or approximately equivalent to the input signal, and performs an image conversion process of a different type according to the comparison result of distance information of a preset region unit in the input image signal and a predetermined threshold.

Further, according to an embodiment of the invention, there is provided an image processing method in an image processing apparatus, including the steps of: inputting a two-dimensional image signal, through an image input section; receiving the image signal output from the image input section and generating and outputting a left eye image and a right eye image for realizing binocular stereopsis, by an image converting section; and outputting the left eye image and the right eye image output from the image converting section, through an image output section, wherein the step performed by the image converting section includes: extracting a spatial characteristic amount of the input image signal; generating at least one of the left eye image and the right eye image through an image conversion process for performing an emphasis process in which the characteristic amount is applied to the input image signal; and performing the image conversion process of a different type according to the comparison result of distance information of a preset region unit in the input image signal and a predetermined threshold.

Further, according to an embodiment of the invention, there is provided a program which allows image processing to be executed in an image processing apparatus, including the steps of: enabling an image input section to receive an input of a two-dimensional image signal; enabling an image converting section to receive the image signal output from the image input section and generating and outputting a left eye image and a right eye image for realizing binocular stereopsis; and enabling an image output section to output the left eye image and the right eye image output from the image converting section, wherein the step of enabling the image converting section includes: extracting a spatial characteristic amount of the input image signal; generating at least one of the left eye image and the right eye image through an image conversion process for performing an emphasis process in which the characteristic amount is applied to the input image signal; and performing the image conversion process of a different type according to the comparison result of distance information of a preset region unit in the input image signal and a predetermined threshold.

Here, the program according to the embodiment includes a program which can be provided through a storage medium or a communication medium which is provided in a computer-readable format to a general-use system which can execute a variety of program codes, for example. By providing such a program in a computer-readable format, a process corresponding to the program is realized on the computer system.

Other objects, features and advantages of the invention will be apparent through the following detailed description based on the embodiments of the invention and the accompanying drawings. In this specification, the term "system" refers to a configuration in which a plurality of devices or apparatuses is logically assembled, and is not limited to a configuration in which all the component devices or apparatuses are disposed within the same casing.

According to the configuration in the embodiments of the invention, the two-dimensional image signal is input to generate the left eye image and the right eye image for realizing the binocular stereopsis. The image converting section extracts the spatial characteristic amount of the input image signal, and generates the left eye image and the right eye image by performing the different emphasis process in which the characteristic amount is applied to the input image signal. Specifically, the luminance differential signal of the input image signal or the signal generated by non-linearly converting the luminance differential signal is used as the characteristic amount. The set of the signal generated by adding the characteristic amount to the input image signal and the signal generated by subtracting the characteristic amount from the input image signal is generated as the set of the left eye image and the right eye image. Further, the addition process and the subtraction process is switched according to the distance information of the pixel unit or the preset region unit so as to enlarge the perception range to the anteroposterior regions of the display section. With this configuration, it is possible to generate images capable of stereopsis with a simple signal processing. In addition, since the addition signal of the left eye image and the right eye image is equivalent to the input image signal, it is possible to observe the images as a normal two-dimensional image when observing the images without glasses for stereopsis.

BRIEF DESCRIPTION OF THE DRAWINGS

FIGS. 20A, 20B and 20C are diagrams illustrating a disparity setting and a perceived image between a right eye image and a left eye image.

FIG. 21 is a flowchart illustrating a process sequence performed by an image converting section of an image processing apparatus according to an embodiment of the present invention.

FIG. 25 is a diagram illustrating an example of a non-linear conversion process for an image signal performed in an image converting section of an image processing apparatus according to an embodiment of the present invention.

DESCRIPTION OF THE PREFERRED EMBODIMENTS

Hereinafter, an image processing apparatus, an image processing method and a program according to the present invention will be described with reference to the accompanying drawings.

Figure 1:
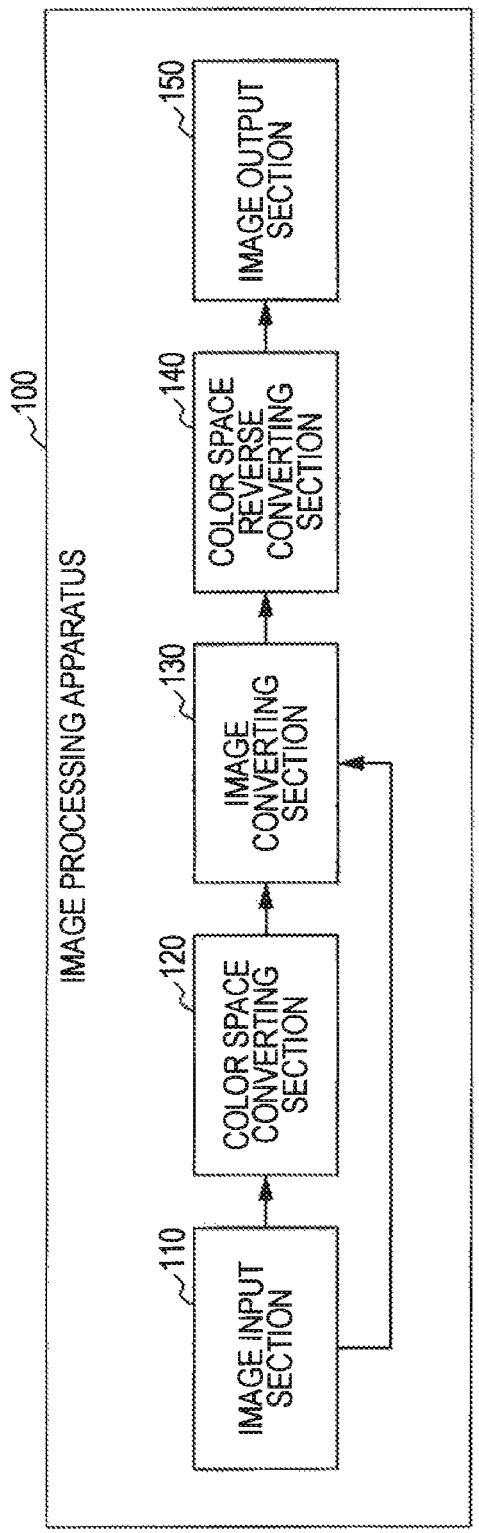
FIG. 1 is a diagram illustrating a configuration example of an image processing apparatus according to an embodiment of the present invention.

FIG. 1 is a diagram illustrating an image processing apparatus according to an embodiment of the present invention. The image processing apparatus 100 receives a still image file output from a digital still camera or the like, or moving image data output from a camcorder or the like through an image input section 110, and converts the received file or data into an internal data format. Here, the internal data format refers to baseband moving image data, which is video data of three primary colors of red (R), green (G) and blue (B) or video data of luminance (Y) and color difference (Cb, Cr). The internal data format may have any color space as long as color space identifying signals are overlapped and a color space converting section 2 in a subsequent stage corresponds thereto.

The video data output from the image input section 110 is input to the color space converting section 120, and is converted into a luminance signal and a color difference signal. At this time, in a case where the input video data is based on Y, Cb and Cr color spaces, the color space converting section 120 outputs the video data without conversion into the color spaces. In a case where the input video data is based on the R, C and B color spaces, or other color spaces, the color space converting section 120 converts the video data into the luminance (Y) and color difference (Cb, Cr) signals for output.

In this respect, the color spaces of the video data output from the color space converting section 120 are not limited to the Y, Cb and Cr spaces, but may be any spaces as long as the color spaces are color spaces in which a luminance component and a color component are separated from each other.

The video data output from the color space converting section 120 is input to an image converting section 130. The image converting section 130 generates a binocular disparity image for a left eye and a right eye through a process to be described later, and synthesizes and outputs the images according to the format of a three-dimensional display apparatus. That is, the image converting section 130 extracts a spatial characteristic amount of an input image signal, and generates a left eye image and a right eye image by performing a different emphasis process for the extracted characteristic amount.

The video data output from the image converting section 130 is input to a color space reverse converting section 140, and is converted into color spaces based on the output image format from the Y, Cb and Cr color spaces. At this time, in a case where the output image format is based on the Y, Cb and Cr color spaces, the color space reverse converting section 140 outputs the video data without conversion into the color spaces. The image processing apparatus in FIG. 1 has the configuration of the color space converting section 120 and the color space reverse converting section 140, but this configuration is not necessary, and thus may be omitted.

The video data output from the color space reverse converting section 140 is input to the image output section 150. The image output section 150 converts and outputs the color spaces into video data which is receivable in the externally connected three-dimensional display apparatus which can display the binocular disparity image converted in the image converting section 130 so as to realize stereopsis.

In this embodiment, in a case where the still image is input, the method of converting the still image into the video data in the image input section 110 is disclosed, but the present invention is not limited thereto. For example, one still image may be converted into two images for left eye image and right eye image, and two still images may be output to a memory card or the like as a file, for example.

Figure 2:
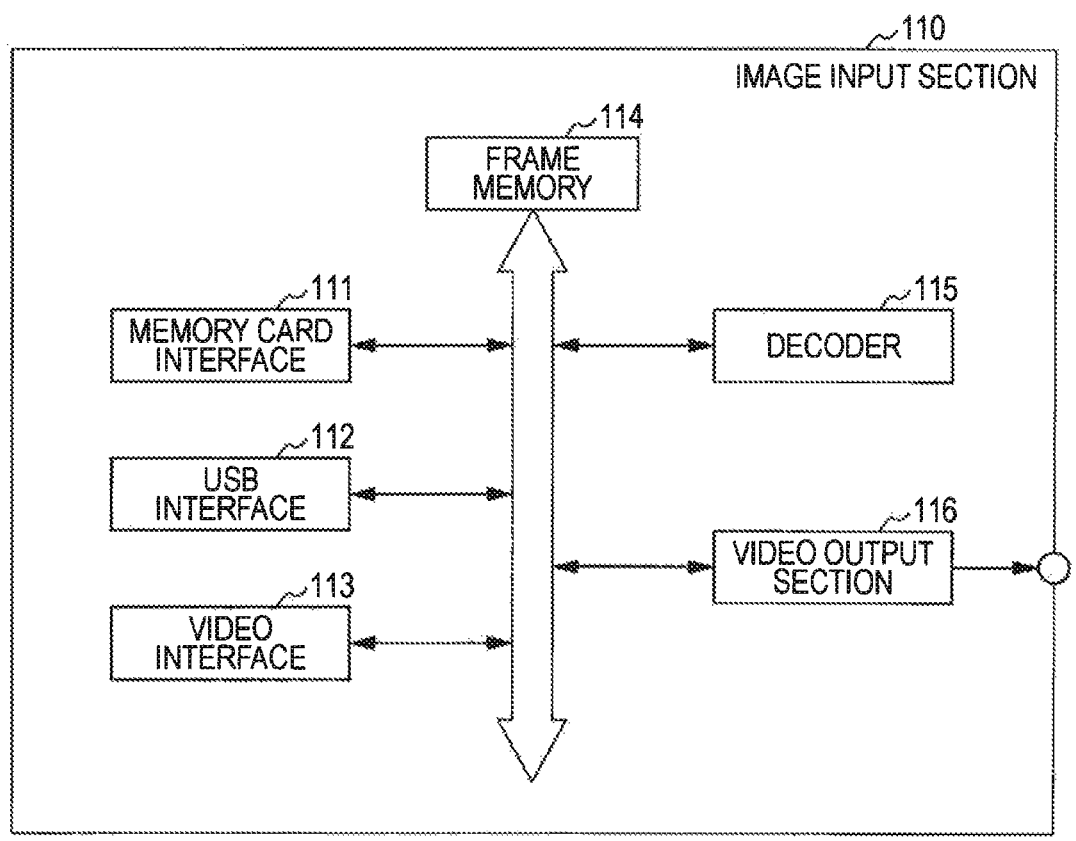
FIG. 2 is a diagram illustrating a configuration example of an image input section of an image processing apparatus according to an embodiment of the present invention.

FIG. 2 is a block diagram illustrating a configuration of the image input section 110 according to an embodiment. The image input section 110 is provided with a memory card interface 111 for input of a still image file or the like; a USB interface 112 for direct connection with a video device; a video interface 113 for input of a video signal; a frame memory 114; a decoder 115; and a video output section 116.

Figure 3:
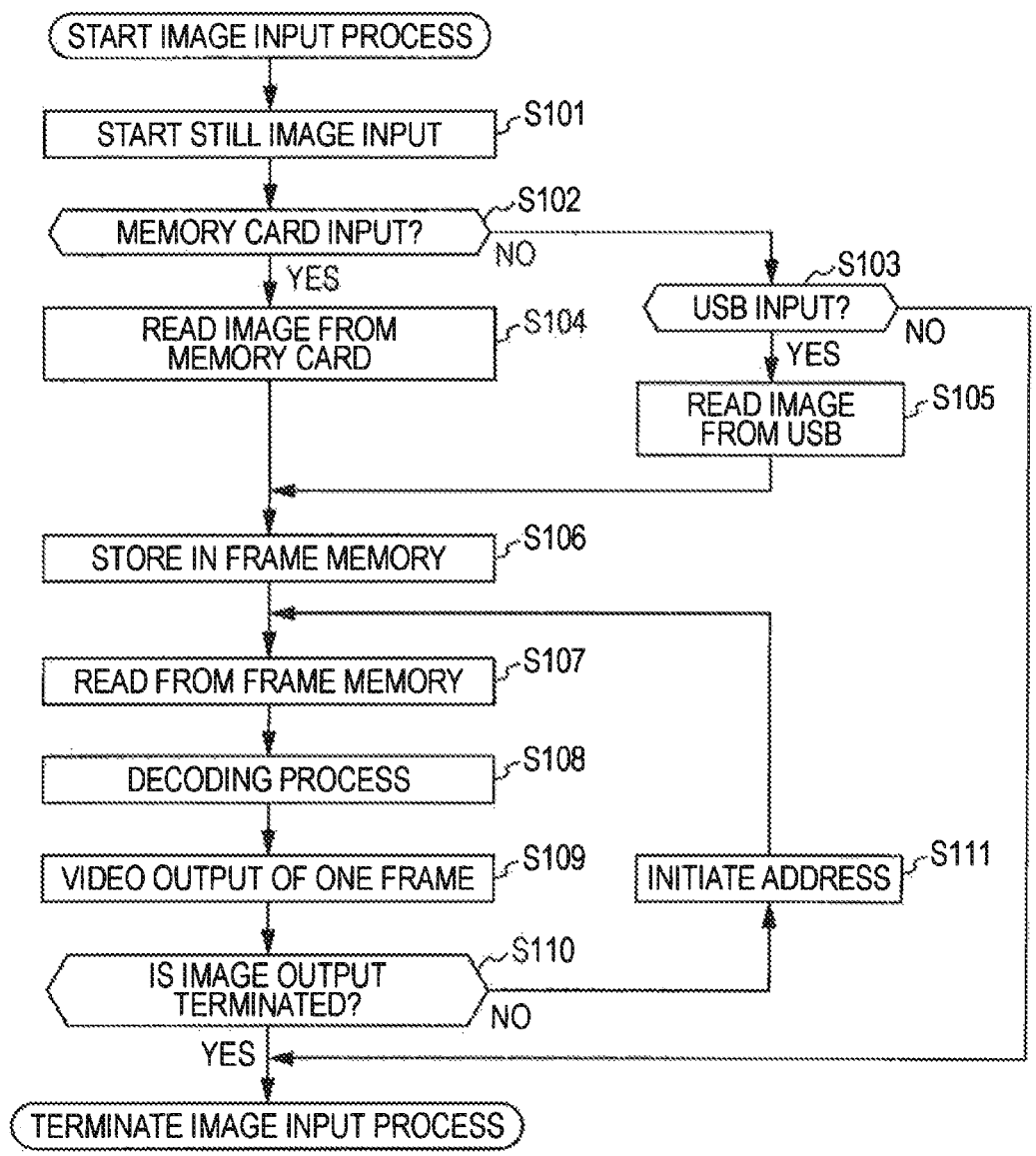
FIG. 3 is a flowchart illustrating a process sequence in a case where an input image is a still image, which is a process example of an image input section of an image processing apparatus according to an embodiment of the present invention.

As an example of a process in the image input section 110, a process sequence in a case where a still image is input will be described with reference to a flowchart shown in FIG. 3.

In step S101, the image input section 110 starts receiving an input of the still image.

In step S102, the image input section 110 confirms whether a memory card is inserted in the memory card interface 111, and determines whether image data is input from the memory card. In a case where the memory card is inserted, the procedure goes to step S104, and in a case where the memory card is not inserted, the procedure goes to step S103.

In step S103, the image input section 110 confirms whether an external device which can input a still image is connected to the USB interface 112, and determines whether image data is input through the USB interface 112. In a case where the USB device is connected, the procedure goes to step S105, and in a case where the USB device is not connected, the image input process is terminated.

Here, in order to determine which medium receives the input of moving image data, a method of giving an instruction to an input device using a manipulation section (not shown) may be used.

In step S104, the image input section 110 reads the image data from the still image file recorded in the memory card. At this time, the still image file in the memory card may be selected using the manipulation section (not shown), or may be automatically selected according to the order determined according to a specific standard.

In step S105, the image input section 110 reads the still image data from the external device connected to the USB interface. At this time, the still image file in the external device may be selected using the manipulation section (not shown), or may be automatically selected according to the order determined according to a specific standard.

In step S106, the image input section 110 stores the still image data read in step S104 or step S105 in a frame memory 114.

In step S107, the image input section 110 reads the still image data from the frame memory 114 by a controller (not shown). At this time, the read address represents a head of the image data stored in step S106.

In step S108, the image input section 110 decodes the still image. Since the still image data is generally image-compressed according to a format regulated according to the JPEG (Joint Photographic Experts Group) or the like, the decoder 115 performs an image decompression process according to the image format, and restores baseband image data.

In step S109, the image input section 110 outputs the decoded still image data as one frame of the video data. Here, the format of the video data is based on an output format in the image output section 150. That is, in a case where video data having a HD (High Definition) resolution and a frame rate of 60 frames per second is output from the image output section 150, the controller (not shown) generates a video synchronization signal having a HD resolution a frame rate of 60 frames per second, and pastes the still image in an effective region of the signal for output.

In step S110, it is determined whether the image output process in the image output section 150 is terminated. In a case where the image output process is terminated, the image input process is terminated. In a case where the image output process is not terminated, the procedure goes to step S111.

In step S111, the image input section 110 initializes a reading address of the frame memory 114 and displays the head of the still image data stored in step S106. If the address initiation in step S111 is terminated, the procedure goes to step S107, and then the processes of step S107 to step S111 are repeated.

In this way, in the case where the still image is input, the image input section 110 converts the still image into video data in which the same images are continuous.

Figure 4:
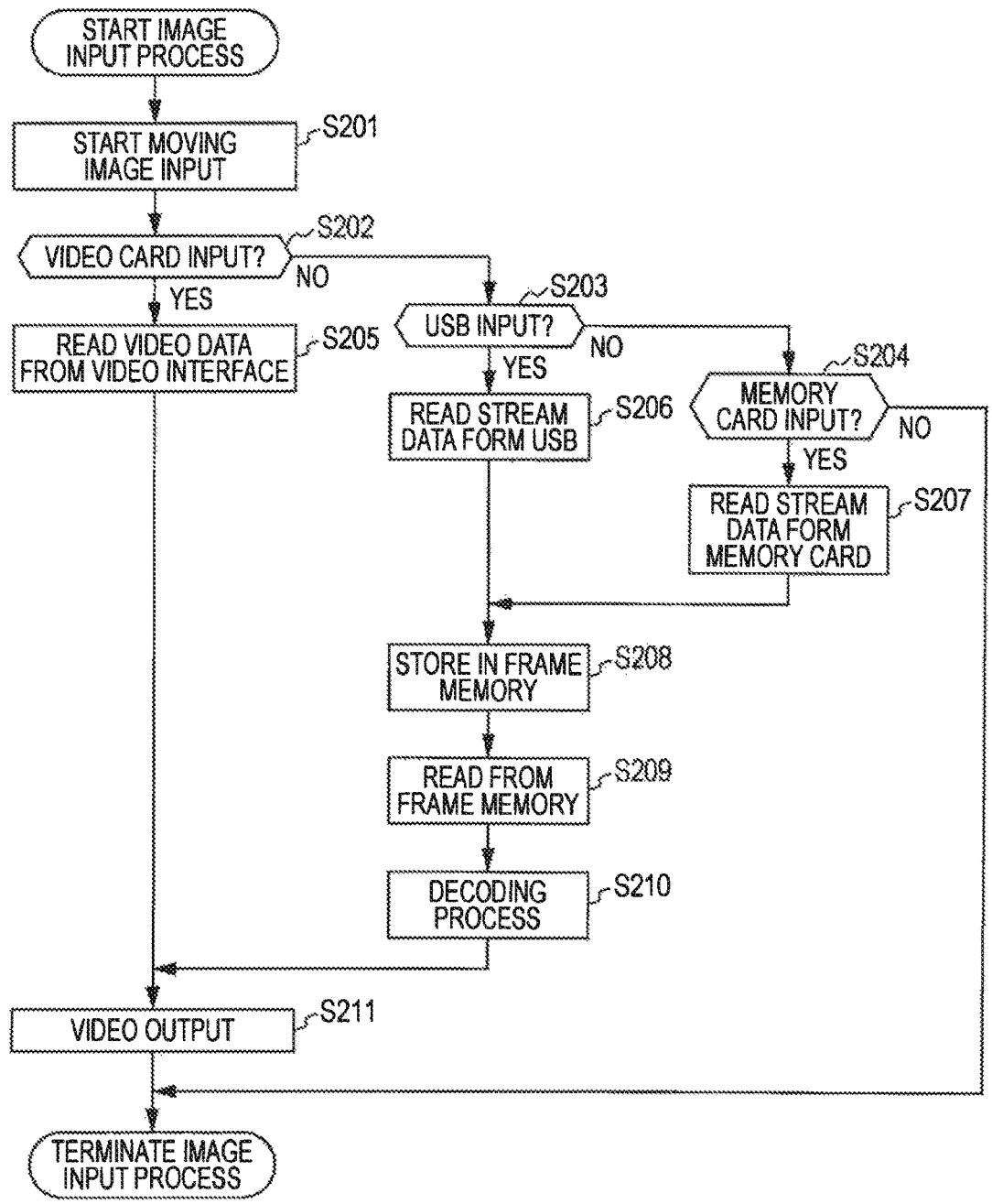
FIG. 4 is a flowchart illustrating a process sequence in a case where an input image is a moving image, which is a process example of an image input section of an image processing apparatus according to an embodiment of the present invention.

Next, as an example of a process in the image input section 110, a process sequence in a case where the moving image is input will be described with reference to a flowchart shown in FIG. 4.

In step S201, the image input section 110 starts receiving an input of the moving image.

In step S202, the image input section 110 confirms whether a video signal is input through the video interface 113, and determines whether moving image data is input through the video interface 113. In a case where the video signal is input, the procedure goes to step S205, and in a case where the video signal is not input, the procedure goes to step S203.

In step S203, the image input section 110 confirms whether an external device from which a moving image can be input is connected to the USB interface 112, and determines whether the moving data is input through the USB interface 112. In a case where the USB device is connected, the procedure goes to step S206, and in a case where the USB device is not connected, the procedure goes to step S204.

In step S204, the image input section 110 confirms whether the memory card is inserted in the memory card interface 111, and determines whether moving image data is input from the memory card. In a case where the memory card is inserted, the procedure goes to step S207, and in a case where the memory card is not inserted, the image input process is terminated.

Here, in order to determine whether the moving image data is input from a specific data medium, a method of giving an instruction to the input apparatus using the manipulation section (not shown) may be used.

In step S205, the image input section 110 reads the video data from the video interface 113. The video interface 113 receives an input of a video signal transmitted in a digital video transmission method such as DVI (Digital Video Interface), HDMI (High-Definition Multimedia Interface), HDSDI (High-Definition Serial Digital Interface) or the like, or a video signal transmitted in an analog video transmission method such as the NTSC (National Television Standards Committee) method, a component method or the like. In a case where an analog video signal is input, the video interface 113 converts the input analog video signal to a baseband signal by a demodulation process, and then converts the baseband signal into a digital signal by an A/D converter (not shown). On the other hand, in a case where a digital video signal is input, the digital video signal is converted into a baseband signal by the demodulation process.

In step S206, the image input section 110 reads the moving image data from the external device connected to the USB interface 112. At this time, the moving image file in the external device may be selected using the manipulation section (not shown), or may be automatically selected according to the order determined according to a specific standard.

In step S207, the image input section 110 reads the image data from the moving image file recorded in the memory card. At this time, the moving image file in the memory card may be selected using the manipulation section (not shown), or may be automatically selected according to the order determined according to a specific standard.

In this respect, the moving image data input through the USB interface 112 or the moving image data recorded in the memory card is streaming data compressed with a moving image compression method regulated according to the MPEG (Moving Picture Experts Group or the like). Since such a compression method should perform a decoding process using the frame memory, the stream data is stored in the frame memory 114 in step S208.

In step S209, the image input section 110 reads the moving image data from the frame memory 114 by the controller (not shown).

In step S210, the image input section 110 decodes the moving image. As described above, since the moving image data stored in the frame memory 114 is the stream data compressed through the MPEG or the like, the decoder 115 performs the image decompression process based on the image format and restores the baseband video data.

In step S211, the video output section 116 outputs any one of the video data output from the video interface 113 and the video data output from the decoder 115 in the internal data format.

Figure 5:
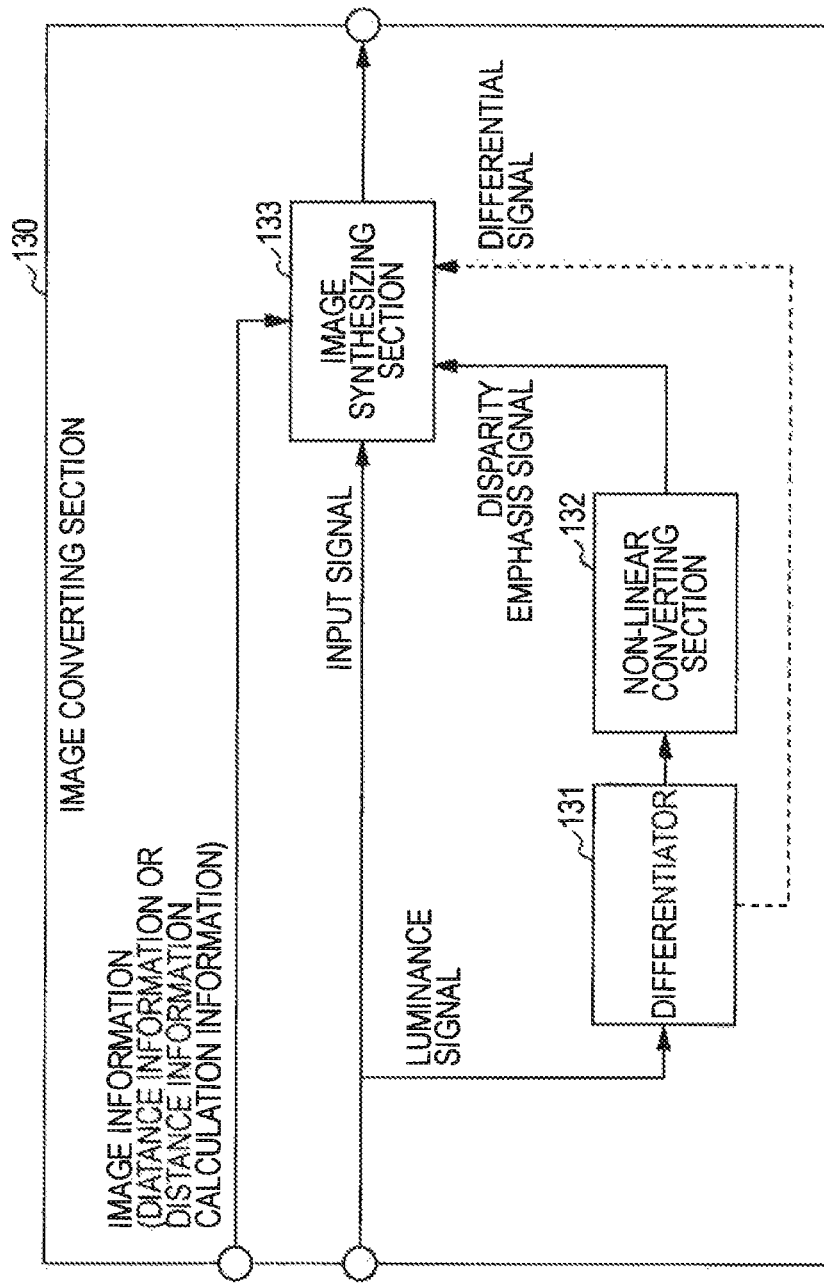
FIG. 5 is a diagram illustrating a configuration example of an image converting section of an image processing apparatus according to an embodiment of the present invention.

FIG. 5 is a block diagram illustrating a configuration of the image converting section 130 according to an embodiment. The image converting section 130 extracts the spatial characteristic amount of the input image signal, and generates the left eye image and the right eye image by performing the different emphasis process for the extracted characteristic amount. The image converting section 130 includes a differentiator 131, a non-linear converting section 132 and an image synthesizing section 133.

The differentiator 131 extracts a luminance signal from the video data input to the image converting section 130, and then generates a differential signal for the luminance signal. Specifically, for example, the luminance signal of the image is input in the horizontal direction, and the differential signal is generated by performing a first-order differentiation for the input luminance signal. In the first-order differentiation process a linear first-order differential 3-tap transversal filter is used, for example.

The non-linear converting section 132 non-linearly converts the differential signal output from the differentiator 131, and outputs the converted signal as a disparity emphasis signal.

Figure 6:
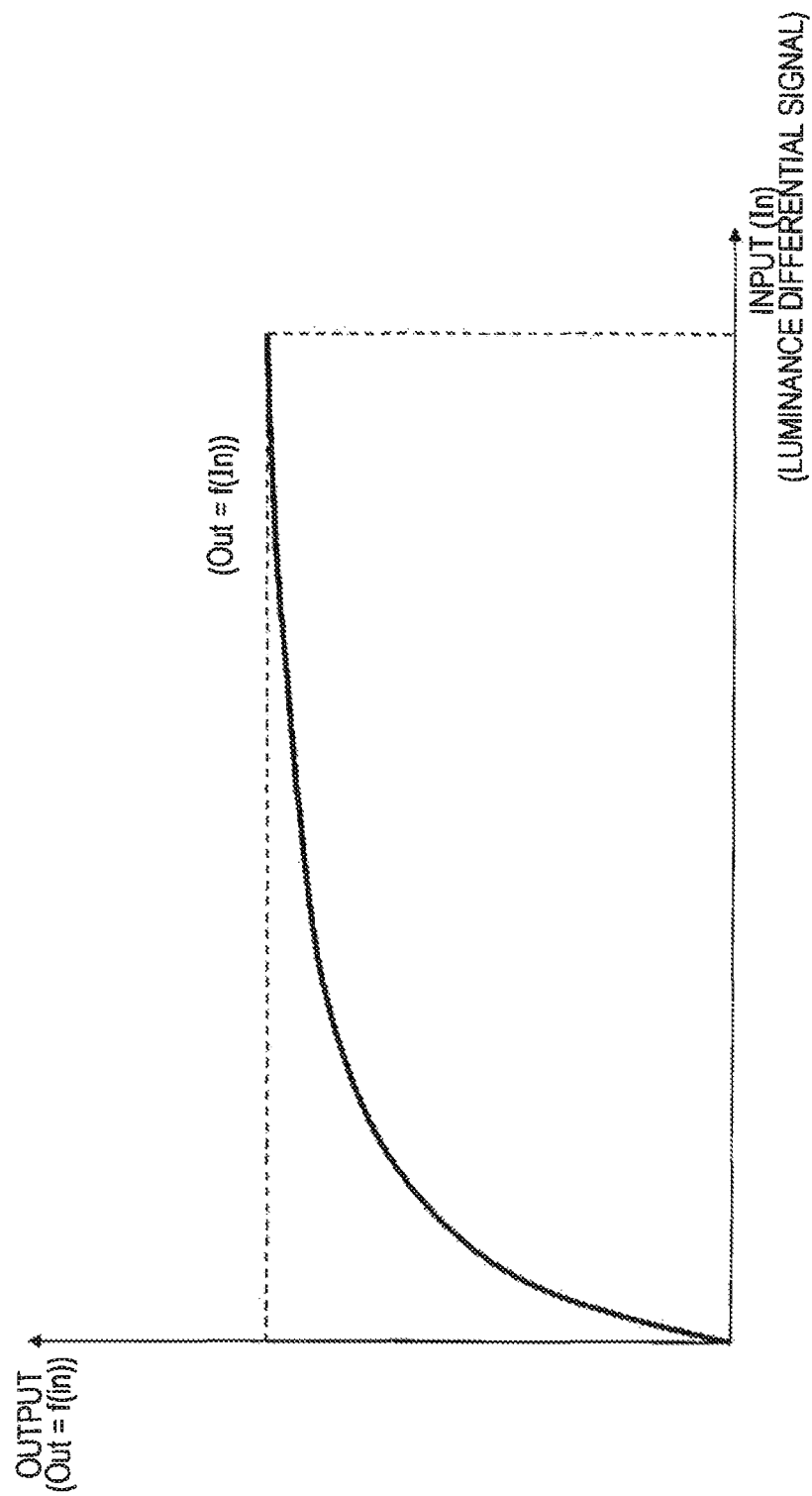
FIG. 6 is a diagram illustrating an example of a non-linear conversion process for an image signal performed by an image converting section of an image processing apparatus according to an embodiment of the present invention.

FIG. 6 is an example of a non-linear conversion process performed in the non-linear converting section 132. The horizontal axis represents an input signal from the differentiator 131, which is a luminance differential signal. The vertical axis represents an output after the non-linear conversion process in the non-linear converting section 132. The non-linear converting section 132 converts an input differential signal (In) according to a predetermined function f(x) to output a disparity emphasis signal (Out). That is, Out=f(In). Here, the function f(x) can be set in a variety of manners. As an example of the function f(x), for example, an exponential function as shown in the following formula can be used.

$$f(x)=x^\beta$$

where β is a preset coefficient, which can be set to a variety of values.

Further, the conversion function in the non-linear converting section 132 is not limited to the exponential function, and may use a linear conversion.

FIG. 25 illustrates another example of the non-linear conversion process performed in the non-linear converting section 132. In a similar way to FIG. 6, the horizontal axis represents an input signal from the differentiator 131, which is a luminance differential signal. The vertical axis represents an output after the non-linear conversion process in the non-linear converting section 132. The non-linear converting section 132 converts an input differential signal (In) according to a predetermined function f(x) to output a disparity emphasis signal (Out). That is, Out=f(In). The example shown in FIG. 25 is an example in a case where a function f(x) shown in the following formula 10 is used as the function f(x). Here, gain, γA, γB and Da are predetermined coefficients, which can be set as a variety of values.

if (in ≦ Da):  (formula 10)

$$out = (in \times gain)^{\gamma A}$$

if (in > Da):

$$out = \{(1.0 - in) \times gain\}^{\gamma B} \times \frac{(Da \times gain)^{\lambda A}}{\{(1 - Da) \times gain\}^{\gamma B}}$$

Such a non-linear conversion process is performed to generate a more desirable three-dimensional image. For example, in the non-linear conversion process shown in FIG. 25, if the input differential signal (In) exceeds an arbitrary threshold Da, the disparity emphasis signal (Out) tends to be restricted. With such an effect, it is possible to restrict an unnecessary high frequency emphasis of the right eye image signal and left eye image signal which are finally generated, and also to emphasize a depth feeling of the right eye image signal and left eye image signal which are generated.

The image synthesizing section 133 receives the disparity emphasis signal output from the non-linear converting section 132 and the video data input to the image converting section 130, and synthesizes each frame image and the disparity emphasis signal for forming the video data to generate a left eye image and a right eye image.

As indicated by a dashed line in FIG. 5, the image converting section 130 may have a configuration in which the conversion process of the non-linear converting section 132 is omitted and the differential signal generated by the differentiator 131 is directly input to the image synthesizing section 133, and thus, the image synthesizing section 133 generates the left eye image and the right eye image using the differential signal.

In this way, the image synthesizing section 133 generates the left eye image and the right eye image using the differential signal generated by the differentiator 131 or the disparity emphasis signal output from the non-linear converting section 132, as the spatial characteristic amount of the input image signal.

The image synthesizing section 133 generates the left eye image and the right eye image using each frame image for forming the video data, and the spatial characteristic amount generated from the frame image, that is, the differential signal of the luminance signal or the disparity emphasis signal generated by nonlinearly converting the differential signal.

Figure 7:
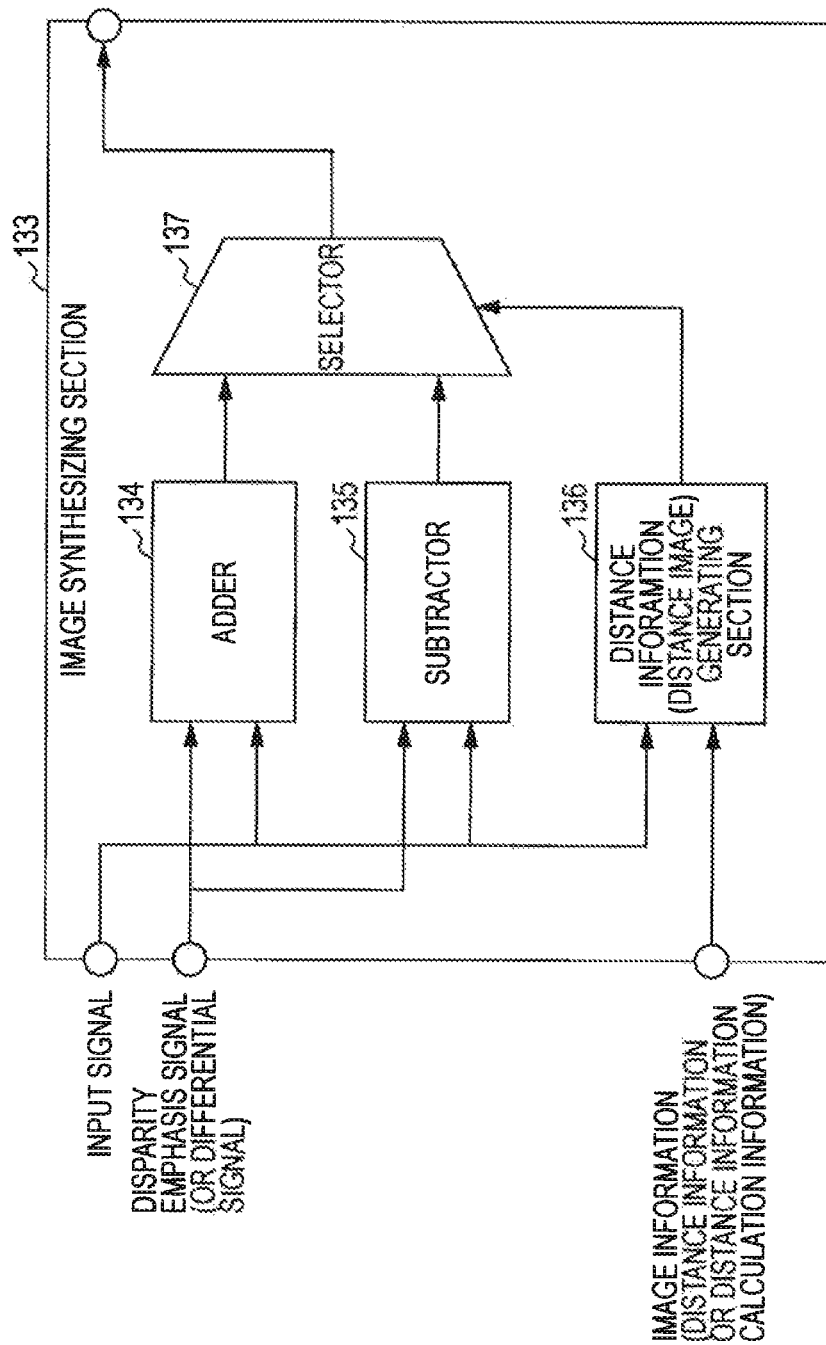
FIG. 7 is a diagram illustrating a configuration example of an image synthesizing section in an image converting section of an image processing apparatus according to an embodiment of the present invention.

FIG. 7 is a block diagram illustrating a configuration of the image synthesising section 133 according to an embodiment. The image synthesizing section 133 includes an adder 134, a subtractor 135, a distance information (distance image) generating section 136 and a selector 137.

The distance information (distance image) generating section 136 calculates or obtains the distance from the photographing position (camera position) in pixel units for forming an image which is a process target, or in preset region units of a block or the like, including a predetermined plurality of pixels, and outputs the result to the selector 137. Specifically, for example, the distance information (distance image) generating section 136 generates a distance image in which the distance is indicated as a luminance level and outputs the distance image to the selector 137. Existing techniques set out in the related art can be used as a method of obtaining or generating the distance of the image forming pixel unit or the preset region unit. For example, distance information measured by a distance measurement device such as a laser-range scanner at the time of image generation is added to the image as image attribute information, to thereby obtain the distance. Alternatively, the distance of the pixel or the preset region unit is calculated using existing techniques for calculating the distance through image analysis.

The distance information obtained or generated by the distance information (distance image) generating section 136 is output to the selector 137. The selector 137 compares a preset distance threshold with the distance of a pixel (distance from a camera) in a current process, which is output from the distance image generating section 136. According to the comparison result, it is determined whether a left eye image (L image) and a right eye image (R image) is to be output through either the adder 134 or the subtractor 135, for output.

The adder 134 or the subtractor 135 adds or subtracts the disparity emphasis signal obtained by nonlinearly converting the differential signal to or from the input signal, for output. That is, the adder 134 generates and outputs a signal of "input signal+disparity emphasis signal", and the subtractor 135 generates and outputs a signal of "input signal−disparity emphasis signal".

The selector 137 compares the preset distance threshold with the distance of the pixel (distance from the camera) in the current process which is output from the distance image generating section 136, and outputs the output of the adder 134 and the output of the subtractor 135 as the left eye image (L image) or the right eye image (R image), according to the following table 1.

TABLE 1

| distance from photographing position | output image | output |
|---|---|---|
| distance ≤ threshold | left eye image (L image) | input signal − disparity emphasis signal (output of subtractor) |
| | right eye image (R image) | input signal + disparity emphasis signal (output of adder) |
| Distance > threshold | left eye image (L image) | input signal + disparity emphasis signal (output of adder) |
| | right eye image (R image) | input signal − disparity emphasis signal (output of subtractor) |

As shown in the Table 1, the image synthesizing section 133 sets and outputs the left eye image (L image) and the right eye image (R image) as follows, according to the distance information from the distance image generating section 136.

In the case of "distance from the photographing position≤threshold", the left eye image (L image) is "input signal−disparity emphasis signal" (output of the subtractor), and the right eye image (R image) is "input signal+disparity emphasis signal" (output of the adder), which are output as the left eye image (L image) and the right eye image (R image), respectively.

On the other hand, in the case of "distance from the photographing position>threshold", the left eye image (L image) is "input signal+disparity emphasis signal" (output of the adder), and the right eye image (R image) is "input signal−disparity emphasis signal" (output of the subtractor), which are output as the left eye image (L image) and the right eye image (R image), respectively.

Figure 8:
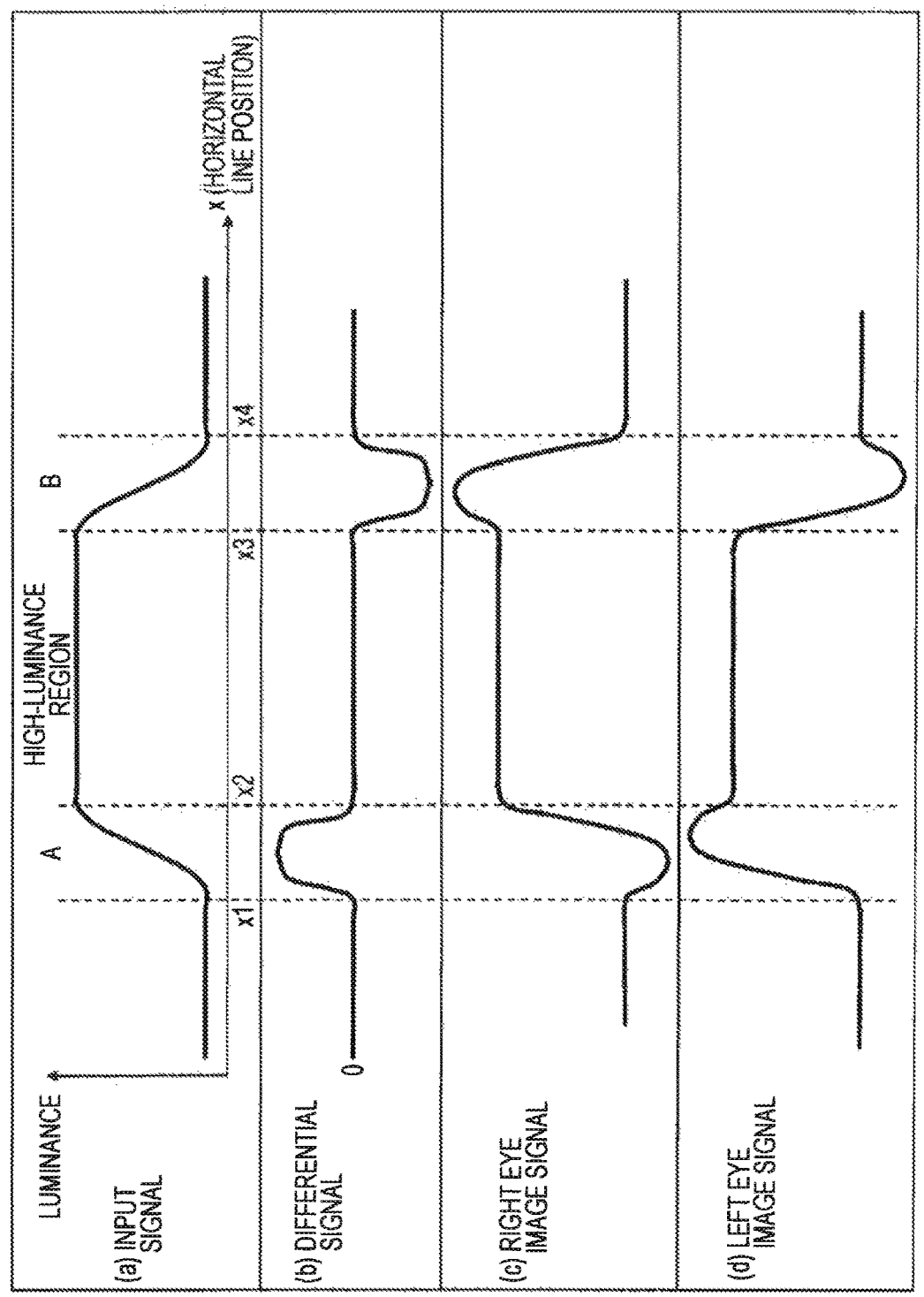
FIG. 8 is a diagram illustrating an example of an image signal generating process for the right eye and the left eye from an input image performed by an image converting section of an image processing apparatus according to an embodiment of the present invention.

An example of the image synthesis process performed by the image synthesizing section 133 will be described with reference to FIG. 8. The process shown in FIG. 8 is a process corresponding to a pixel region in a case where the distance from the photographing position in the above table 1 satisfies "distance>threshold". In this case, the image synthesizing section 133 generates the left eye image (L image) which is "input signal+disparity emphasis signal" (output of the adder) and the right eye image (R image) which is "input signal−disparity emphasis signal" (output of the subtractor), and outputs the left eye image (L image) and the right eye image (R image), respectively.

FIG. 8 illustrates an input signal (a), a differential signal (b), a right eye image signal (c) and a left eye image signal (d), respectively, in the order named from the top.

Here, the input signal (a) represents change in the luminance of a single arbitrary horizontal line in an arbitrary frame of the video data. There is exemplified one line in which a high luminance region having a high level of luminance exists in the center area thereof. In a region A ranging from a line position (x1) to a line position (x2), the luminance is changed to gradually become high. Between the line position (x2) and a line position (x3), the high luminance region in which the high level of luminance is maintained exists. Then, in a region B ranging from the line position (x3) to a line position (x4), the luminance is changed to gradually decrease.

The differential signal (b) is a result obtained by differentiating the input signal (a). The differential signal is a signal generated in the differentiator 131 of the image converting section 130 shown in FIG. 5.

As shown in the figure, the differential signal generated in the differentiator 131 has a positive value in the region A in which the luminance change of the input signal (a) becomes positive, and has a negative value in the region B in which the luminance change of the input signal (a) becomes negative.

The right eye image signal (c) and the left eye image signal (d) are signals generated in the image synthesizing section 133 of the image converting section 130 shown in FIG. 5. The image synthesizing section 133 synthesizes the input signal (a) with the disparity emphasis signal which is the result (output of the non-linear converting section 132) obtained by non-linearly converting the differential signal (b) in the non-linear converting section 132, to generate the right eye image signal (c) and the left eye image signal (d).

It is assumed that the luminance level of the video data corresponding to the input signal (a) in FIG. 8 is (S), and the signal level of the disparity emphasis signal obtained by non-linearly converting the differential signal (b) in FIG. 8 is (E).

The image synthesizing section 133 receives the video data (S) corresponding to the input signal (a) and the disparity emphasis signal (E) obtained by non-linearly converting the differential signal (b), and generates the right eye image signal (Right) and the left eye image signal (Left) according to the following formula 1, for example.

$Right = S - E$ $Left = S + E$ (formula 1)

Here, the image synthesizing section 133 may perform conversion for any one signal, without conversion of both of the left eye image signal (Left) and the right eye image signal (Right) as shown in the formula 1.

That is, the following signal combination may be available.

$Right = S - E$ $Left = S$

Alternatively, the following signal combination may be available.

$Right = S$ $Left = S + E$

Through such a process, images in which a retinal image difference is generated and depth is perceived, can be obtained as the right eye image signal (Right) and the left image signal (Left). Further, the relation between the retinal image difference and the depth perception will be described with reference to FIG. 13.

As described above, the image converting section 130 may have a configuration in which the conversion process of the non-linear converting section 132 is omitted and the differential signal generated by the differentiator 131 is directly input (see the dashed line in FIG. 5) to the image synthesizing section 133, and then, the image synthesizing section 133 generates the left eye image and the right eye image using the differential signal. In this case, the disparity emphasis signal (E) is replaced with the differential signal.

In this way, the image synthesizing section 133 generates the left eye image and the right eye image by extracting the spatial characteristic amount of the input image signal and performing a different emphasis process in which the characteristic amount is applied to the input image signal. The characteristic amount is the luminance differential signal of the input image signal or the disparity emphasis signal generated by the non-linear conversion process for the luminance differential signal.

The right eye image signal (Right) (c) in FIG. 8 is a signal generated by subtracting the disparity emphasis signal (E) obtained by non-linearly converting the differential signal (b) from the input signal (a).

The right eye image signal (Right) (c) is generated as a signal having the following signal characteristics (c1) to (c3) as shown in the right eye image signal (c) in FIG. 8.

(Signal Characteristics)

(c1) In at least a part of the region A in which the luminance change of the input signal (a) is a positive value and the differential signal (b) is a positive value, a signal region having luminance lower than that of the input signal (a) occurs.

(c2) In at least a part of the region B in which the luminance change of the input signal (a) is a negative value and the differential signal (b) is a negative value, a signal region having luminance higher than that of the input signal (a) occurs.

(c3) In a region where the differential signal (b) is a value "zero", the luminance change for the input signal (a) does not occur.

Further, the left eye image signal (Left) (d) in FIG. 8 is a signal generated by adding the disparity emphasis signal (E) obtained by non-linearly converting the differential signal (b) to the input signal (a).

The left eye image signal (Left) (d) is generated as a signal having the following signal characteristics (d1) to (d3) as shown in the left eye image signal (d) in FIG. 8.

(Signal Characteristics)

(d1) In at least a part of the region A in which the luminance change of the input signal (a) is a positive value and the differential signal (b) is a positive value, a signal region having luminance higher than that of the input signal (a) occurs.

(d2) In at least a part of the region B in which the luminance change of the input signal (a) is a negative value and the differential signal (b) is a negative value, a signal region having luminance lower than that of the input signal (a) occurs.

(d3) In a region where the differential signal (b) is a value "zero", the luminance change for the input signal (a) does not occur.

As described above, the image synthesizing section 133 synthesizes the input signal (a) with the disparity emphasis signal which is the result (output of the non-linear converting section 132) obtained by non-linearly converting the differential signal (b) in the non-linear converting section 132, to generate the right eye image signal (c) and the left eye image signal (d).

The image synthesizing section 133 generates, for example, if the input signal which is a conversion target corresponds to a still image, the right eye image signal (c) and the left eye image signal (d) through the signal synthesis process based on the formula 1, for one frame image for forming the still image.

If the input signal which is the conversion target corresponds to a moving image, the image synthesizing section 133 generates the right eye image signal (c) and the left eye image signal (d) through the signal synthesis process based on the formula 1, for each frame for forming the moving image. Here, in the case of the moving image, it is possible to change the method of generating the right eye image signal and the left eye image signal, according to the image output section 150 (see FIG. 1) for finally performing the image display or the control method of the display apparatus. Hereinafter, in a case where the input signal which is the conversion target is the moving image (video data), a plurality of exemplary processes performed by the image synthesizing section 133 will be described with reference to FIG. 9.

Firstly, in the case where the input, signal which is the conversion target is the moving image (video data), an exemplary basic process performed by the image synthesizing section 133 will be described with reference to FIG. 9. In the process example shown in FIG. 9, the image synthesizing section 133 generates and outputs both images of the left eye image (Left) and the right eye image (Right), for all frames (frame n, n+1, n+2, n+3 . . . ) of the input video data.

Figure 9:
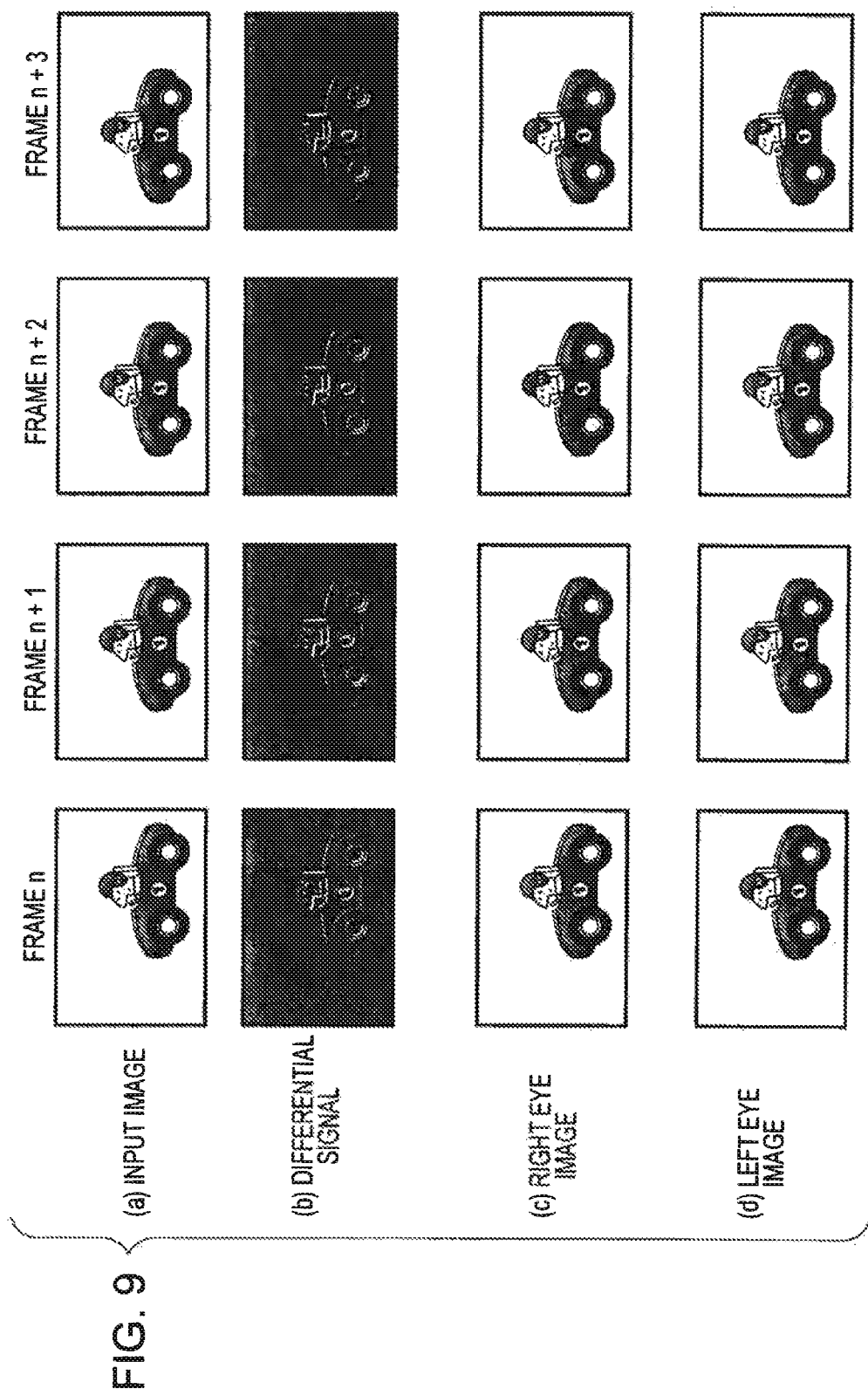
FIG. 9 is a diagram illustrating an example of an image signal generating process for the right eye and the left eye from an input image performed by an image converting section of an image processing apparatus according to an embodiment of the present invention.

The image synthesizing section 133 synthesizes a luminance signal of an input image frame (a) with a disparity emphasis signal which is the result obtained by non-linearly converting a differential image signal (b), for all frames of the input image (a) shown in FIG. 9, to generate a right eye image signal (c) and a left eye image signal (d) in FIG. 9. In this case, the image synthesizing section 133 outputs two types of video signals.

The synthesis process is performed according to the above formula 1, for example. That is, when it is assumed that the luminance level of the video data corresponding to the input signal (a) in FIG. 8 is (S) and the signal level of the disparity emphasis signal obtained by non-linearly converting the differential signal (b) shown in FIG. 8 is (E), the right eye image signal (Right) and the left eye image signal (Left) are generated according to the following formula.

Right=$S-E$  Right eye image signal:

Left=$S+E$  Left eye image signal:

In the basis process example shown in FIG. 9, the image synthesizing section 133 outputs two types of video signals of the right eye image and the left eye image corresponding to all the frames. The image output section 150 (see FIG. 1) receives the two types of signals and outputs data thereon to a display apparatus for realizing stereopsis. The display apparatus performs the output control according to a variety of display methods for realizing stereopsis. As the display methods of the display apparatus, for example, there is an image output method corresponding to a passive eyeglass type in which an image is divided through a polarization filter or a color filter to be observed by the right eye and the left eye, or an image output method corresponding to an active eyeglass type in which an image is alternately and temporally divided by alternately opening and closing a liquid crystal shutter from side to side to be observed by the left eye and the right eye. The display apparatus displays the images based on any display method as described above using the two types of video signals generated by the image synthesizing section 133.

In a case where the image display method is determined in advance, the image synthesizing section 13 can be set to generate and output an output image signal according to each image output method. Hereinafter, process examples of the image synthesizing section 133 according to three different display methods will be described with reference to FIGS. 10 to 12.

There are three types of display methods of the display apparatus for finally performing the image display, as follows.

Figure 10:
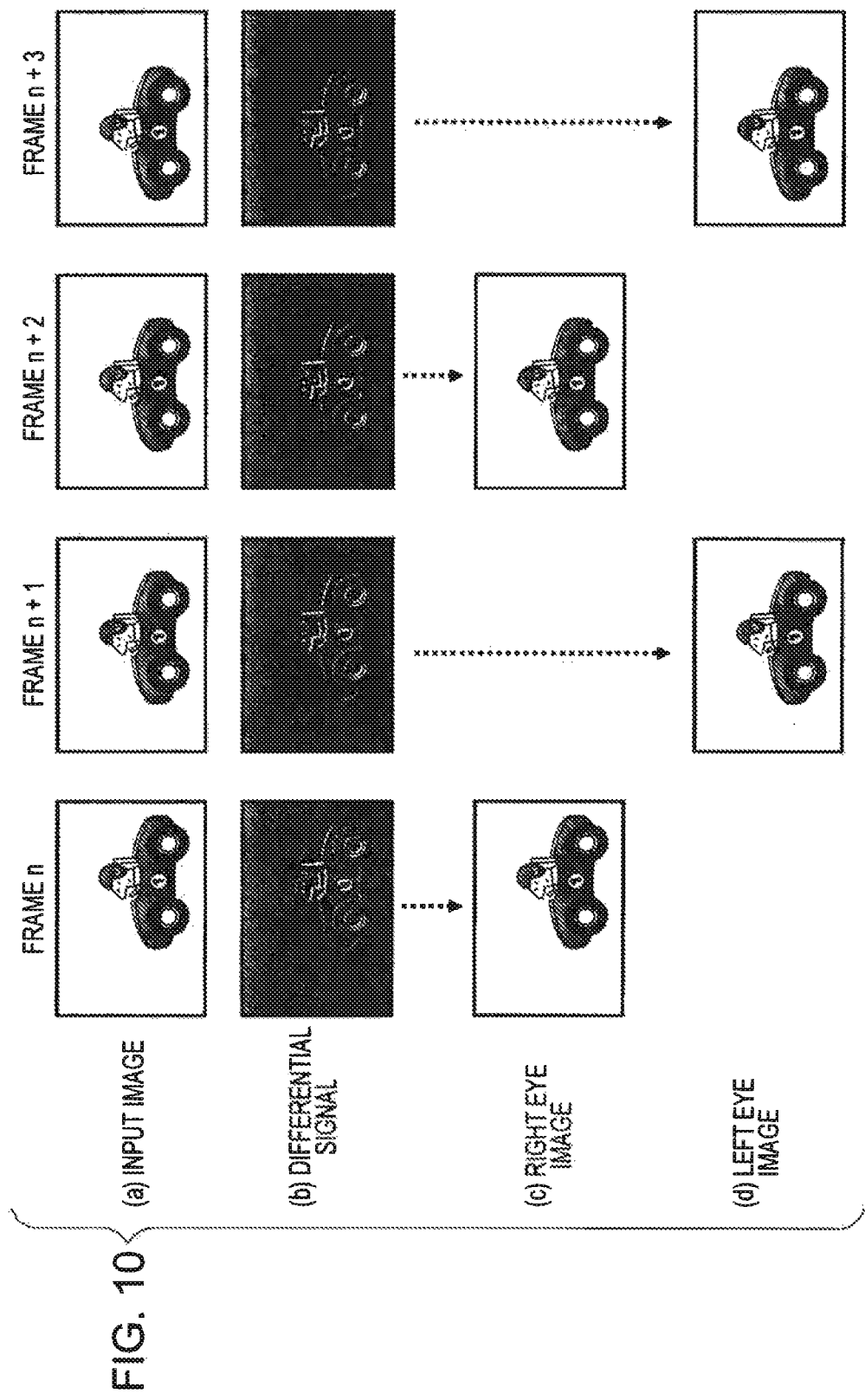
FIG. 10 is a diagram illustrating an example of an image signal generating process for the right eye and the left eye from an input image performed by an image converting section of an image processing apparatus according to an embodiment of the present invention.

(1) Method of alternately outputting the left eye image and the right eye image in a time division manner (FIG. 10)

This is an image output method corresponding to the active eyeglass type in which the image is divided by alternately opening and closing a liquid crystal shutter from side to side in a temporally alternating manner, for example, to be observed by the right eye and the left eye.

Figure 11:
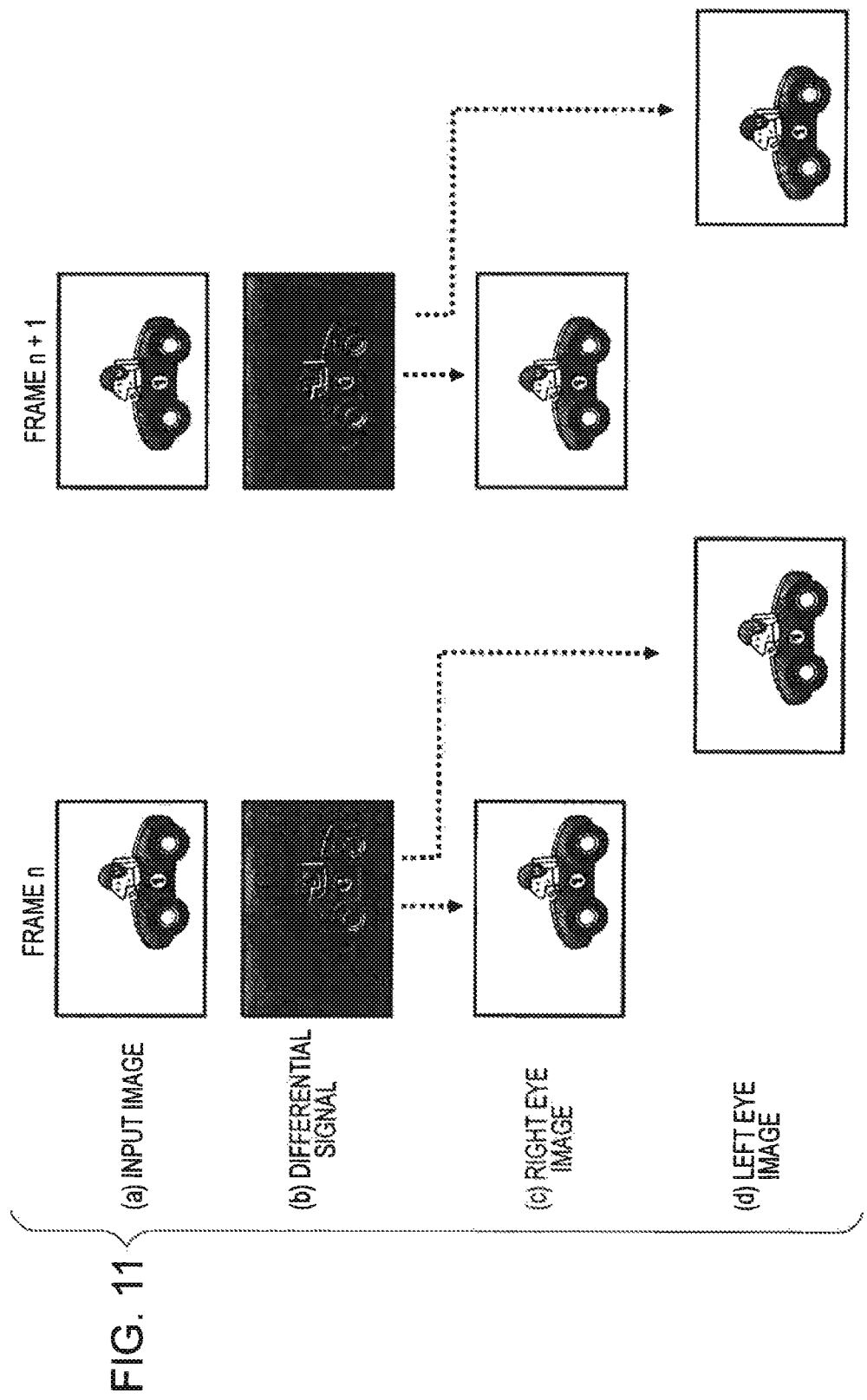
FIG. 11 is a diagram illustrating an example of an image signal generating process for the right eye and the left eye from an input image performed by an image converting section of an image processing apparatus according to an embodiment of the present invention.

(2) Method of alternately outputting the left eye image and the right eye image in a time division manner, in which an output frame rate is high-speed (FIG. 11).

This method uses the same time division as in FIG. 10, in which the output frame rate is high-speed.

Figure 12:
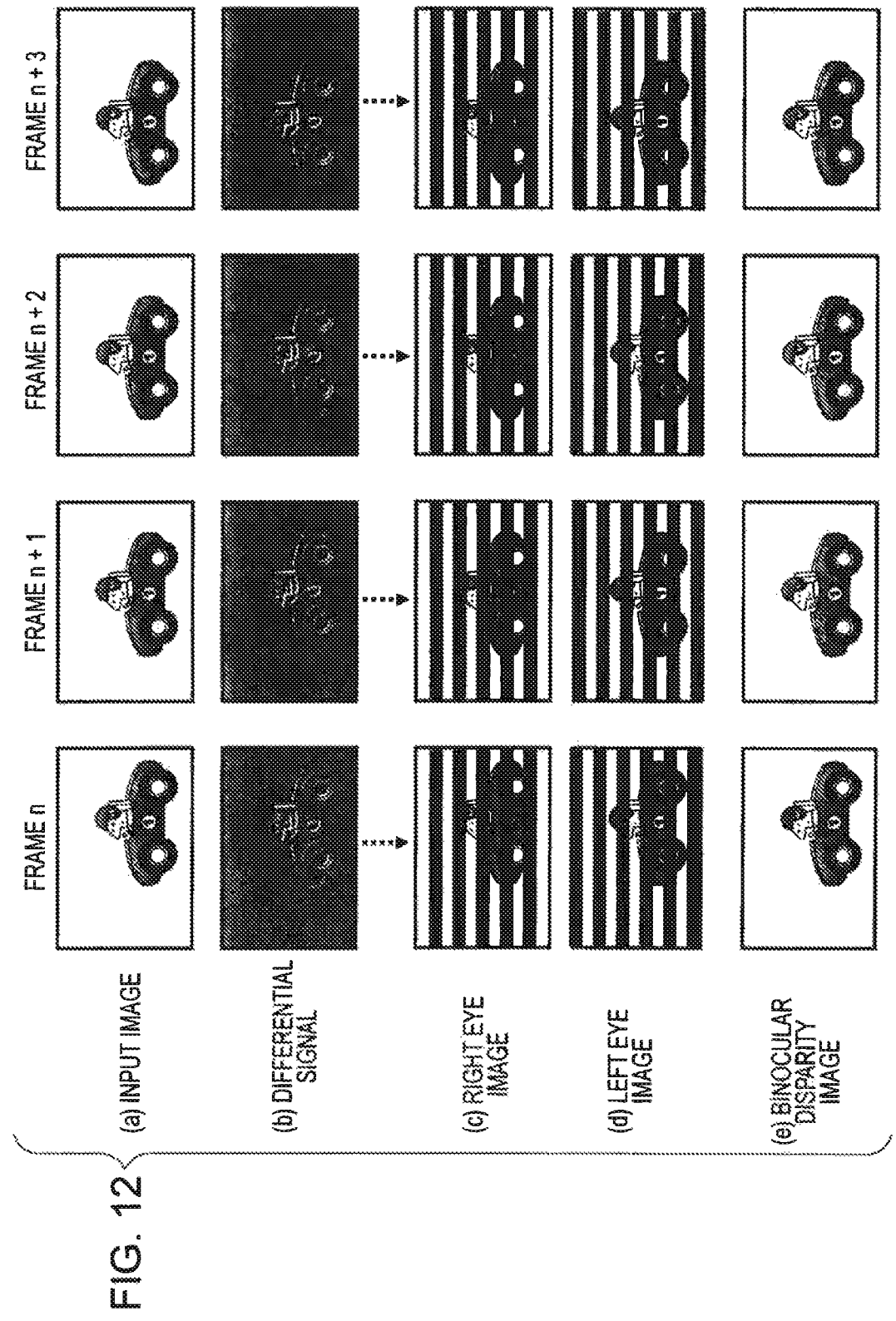
FIG. 12 is a diagram illustrating an example of an image signal generating process for the right eye and the left eye from an input image performed by an image converting section of an image processing apparatus according to an embodiment of the present invention.

(3) Method of spatially dividing the left eye image and the right eye image for a simultaneous output (FIG. 12).

This is an image output method corresponding to the passive eyeglass type in which the image is divided through a polarization filter or a color filter, for example, to be viewed by the right eye and the left eye, respectively. For example, in the three-dimensional display apparatus of the space division type, in a case where a polarization filter, which is set so that the polarizing direction becomes different for every horizontal line, is installed on the front display surface and a user views the images using glasses of the polarizing filter type, the images are separated for every horizontal line and are observed by the left eye and the right eye.

A process example of the image synthesizing section 133 in a case where the display apparatus employs the display method of alternately outputting the left eye image and the right eye image in a time division manner to finally perform the image display, will be described with reference to FIG. 10.

In the case of the image display method, the image synthesizing section 133 alternately generates the left eye image (Left) and the right eye image (Right) for each frame (frame n, n+1, n+2, n+3, and so on) of the input video data for output.

An odd frame and an even frame of the input video data are set and output as the left eye image and the right eye image (or right eye image and left eye image), respectively. In the output image, the left eye image and the right eye image in the image display apparatus are alternately output in a time division manner through the image output section 150. The output timing of each image is controlled to be synchronized with the opening and closing of shutters of liquid crystal shutter-type glasses, which the user wears to observe the images, for example. That is, the output timing is controlled so that the left eye image and the right eye image are alternately and temporally observed by the left eye and the right eye, respectively.

Since the output is performed through a three-dimensional display apparatus of such a time division type, the image synthesizing section 133 performs the image synthesis process for each frame (frame n, n+1, n+2, n+3, and so on) of the input video data by switching the left eye image and the right eye image in a frame unit. That is, as shown in (c) and (d) in FIG. 10, the synthesis of the left eye images (Left) and the synthesis of the right eye images (Right) are alternately performed in the frame unit, for output.

In the examples shown in FIG. 10, the right eye image is generated in the frame n according to the above formula 1. That is, when the luminance level of the video data in the frame n of the input signal (a) in FIG. 10 is (S) and the signal level of the disparity emphasis signal obtained by non-linearly converting the differential signal (b) of the frame n in FIG. 10 is (E), the right eye image signal (Right) is generated according to the following formula.

Right=$S-E$            Right eye image signal:

In the next frame n+1, the left eye image is generated according to the formula 1. That is, when the luminance level of the video data in the frame n+1 of the input signal (a) in FIG. 10 is (S) and the signal level of the disparity emphasis signal obtained by non-linearly converting the differential signal (b) of the frame n+1 in FIG. 10 is (E), the left eye image signal (Left) is generated according to the following formula.

Left=$S+E$            Left eye image signal:

Here, the right eye image is generated in the frame n+2, and the left eye image is generated in the frame n+3. Thereafter, similarly, the right eye image and the left eye image are alternately generated and output for every frame through the image synthesis process according to the formula 1. In this method, the image synthesizing section 133 generates and outputs one of the right eye image and the left eye image in correspondence with each frame. That is, one time of video data is output.

The output images are alternately output as the left eye image and the right eye image in the image display apparatus in a time division manner, through the image output section 150. The output timing of each image is controlled to be synchronized with the opening and closing of the shutters of the liquid crystal shutter-type glasses which the user wears to observe the images. That is, the output timing is controlled so that the left eye image and the right eye image are alternately and temporally observed by the left eye and the right eye, respectively.

FIG. 11 is a process example of the image synthesizing section 133 in a case where the display apparatus employs the display method of alternately outputting the left eye image and the right eye image in a time division manner to finally perform the image display, in a similar way to the process in FIG. 10. Here, in this process, both of the left eye image (Left) and the right eye image (Right) are synthesized through the synthesis process according to the formula 1 for each frame of the input video data for output, unlike the process shown in FIG. 10.

In the display apparatus for performing the image output, the left eye image and the right eye image are alternately output in a time division manner at a frame rate which is two times higher than the input video data.

In this process, the image synthesizing section 133 generates a right eye image (c) and a left eye image (d) from a disparity emphasis signal which is generated from one frame, for example, a frame n of an input image (a) and a differential image (b), using the formula 1, as shown in FIG. 11. Then, the image synthesizing section 133 generates the right eye image (c) and the left eye image (d) from a disparity emphasis signal which is generated from the next frame, that is, a frame n+1 of the input image (a) and the differential image (b), using the formula 1.

In this way, the left eye image and the right eye image are generated from one frame. Two images generated from one frame, that is, the right eye image and the left eye image are alternately output as the left eye image and the right eye image in the image display apparatus in a time division manner, through the image output section 150.

The image output section 150 outputs the images to be displayed at a frame rate which is two times higher than the frame rate of the input image (a) shown in FIG. 11 in the display apparatus. The opening and closing of the shutters of the liquid crystal shutter-type glasses, for example, which the user wears to observe the images is controlled to be synchronized with the display timing of each image. That is, it is controlled so that the left eye image and the right eye image are alternately and temporally observed by the left eye and the right eye. In this method, the image synthesizing section 133 outputs the video data at the frame rate which is two times higher than the one type input video data.

FIG. 12 is a process example of the image synthesizing section 133 in a case where the output is performed to the three-dimensional display apparatus of the space division type. In the three-dimensional display apparatus of the space division type, in a case where a polarizing filter which is set so that the polarizing direction becomes different for every horizontal line is installed on a front display surface and a user views images using glasses of the polarizing filter type, the images are separated for every horizontal line and provided to the left eye and the right eye. That is, polarization filters of the right and left sides of the glasses are also set to have different polarization directions. Thus, only a right eye image (c) shown in FIG. 12 is observed by the right eye, and only a left eye image (d) shown in FIG. 12 is observed by the left eye.

In this process, as shown in FIG. 12, the image synthesizing section 133 generates the right eye image (c) and the left eye image (d) from a disparity emphasis signal generated from one signal, for example, a frame n of the input signal (a) and a differential signal (b), using the formula 1.

Further, the image synthesizing section 133 generates a binocular disparity image (e) shown in FIG. 12 from the right eye image (c) and the left eye image (d). That is, each image of the right eye image (c) and the left eye image (d) is reduced to ½ in the vertical direction by shifting the phase thereof by one line. The image synthesizing section 133 alternately synthesizes the left eye image and the right eye image obtained in this manner in the horizontal line unit to generate and output a single binocular disparity image (d).

The binocular disparity image (d) shown in FIG. 12 is an image generated by connecting effective regions (image display sections other than black lines) of the right eye image (c) and the left eye image (d). That is, the binocular disparity image (d) alternately includes each line data of the right eye image (c) and the left eye image (d). The image synthesizing section 133 generates and outputs the binocular disparity image (d) in this way. In this method, the image synthesizing section 133 outputs one type video data at the same frame rate as in the input image.

The image output section 150 outputs the binocular disparity image (d) shown in FIG. 12 to the three-dimensional display apparatus of the space division type to be displayed. As described above, in the three-dimensional display apparatus of the space division type, the polarizing filter which is set so that the polarizing direction becomes different for every horizontal line is installed on the front display surface thereof. A user observes the images using the glasses of the polarizing filter type. The polarizing filters on the right and left sides of the glasses are also set to have different polarization directions. Thus, only right eye image (c) shown in FIG. 12 is observed by the right eye, and only left eye image (d) shown in FIG. 12 is observed by the left eye.

The right eye image signal (Right) and the left eye image signal (Left) described with reference to FIGS. 9 to 12 are generated according to the above formula 1. That is, the right eye image signal (Right) and the left eye image signal (Left) are generated according to the following formula.

Right=$S$-$E$

Left=$S$+$E$

Here, S represents an input signal, and E represents a disparity emphasis signal obtained by non-linearly converting a differential signal D of the input signal S. Further, as described before, the disparity emphasis signal E may be a signal obtained using a linear conversion, in place of the non-linear conversion of the differential signal D of the input signal S.

The right eye image signal (Right) and the left eye image signal (Left) generated in this manner are observed by the right eye and the left eye of an observer, so that the observer can sense depth. This is a phenomenon based on a retinal image difference between the right eye image and the left eye image. The retinal image difference between the right eye image and the left eye image generated in the image processing apparatus 100 according to the present invention will be described with reference to FIGS. 13 to 16. Hereinafter, in FIGS. 13 to 15, it is assumed that the non-linear conversion process for the differential signal D is omitted and the right eye image signal (Right) and the left eye image signal (Left) are generated using the input signal S and the differential signal D of the input signal S according to the following formula.

Right=$S$-$D$

Left=$S$+$D$

Figure 13:
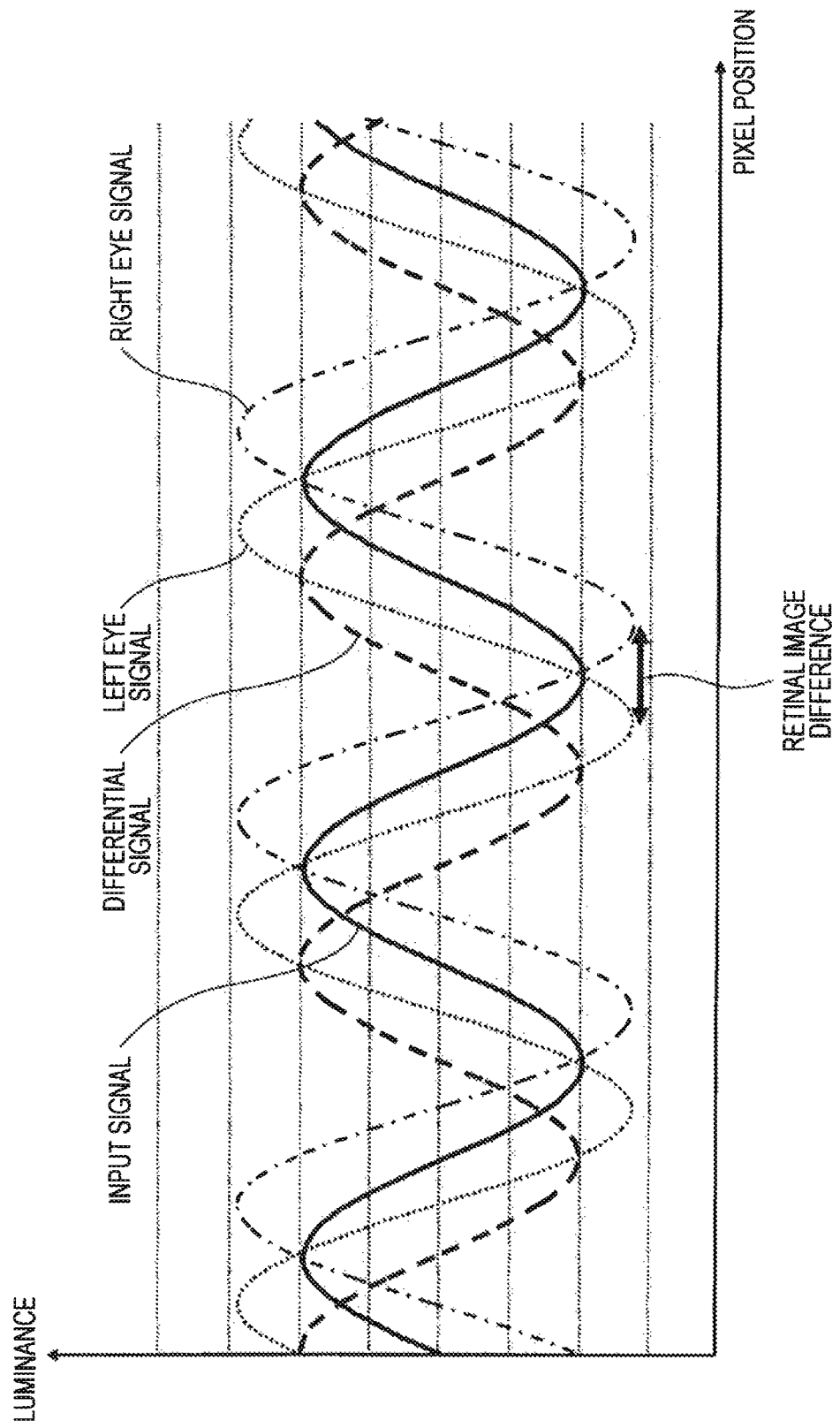
FIG. 13 is a diagram illustrating a retinal image difference between a right eye image and a left eye image generated by an image processing apparatus according to an embodiment of the present invention.

FIG. 13 is a diagram illustrating a retinal image difference generated by addition or subtraction of the differential signal. For simplicity of the description, FIG. 13 shows a state where a left eye signal and a right eye signal is generated in a case where a one-dimensional sine wave signal is input as the input signal. The horizontal axis in the figure represents a pixel position in the image in the horizontal direction and the vertical axis represents a luminance level of the pixel.

The input signal S is expressed as the following formula (formula 2).

$S=\sin \omega x$ (formula 2)

Here, the differential signal D is expressed as the following formula (formula 3).

$D=\cos \omega x$ (formula 3)

At this time, the left eye signal L and the right eye signal R are expressed as the following formulas (formula 4 and formula 5).

$$L = S + D = \sin \omega x + \cos \omega x = \sqrt{2} \sin\left(\omega x + \frac{\pi}{4}\right)$$ (formula 4)

$$R = S - D = \sin \omega x - \cos \omega x = \sqrt{2} \sin\left(\omega x - \frac{\pi}{4}\right)$$ (formula 5)

From the formula 4 and formula 5, the left eye signal L has a phase which advances from the input signal S by π/4, and the right eye signal R has a phase which delays from the input signal S by π/4. That is, the left eye signal L has amplitude which is √2 times the input signal, and is shifted by ⅛ of the cycle determined by an angular frequency ω in the horizontal direction. Similarly, the right signal R has amplitude which is √2 times the input signal, and is shifted by ⅛ of the cycle in the horizontal direction. In this way, a phase difference of π/2 is generated between the left eye signal L and the right eye signal R, the phase difference is perceived as the retinal image difference, thereby making it possible to sense the depth.

Figure 14:
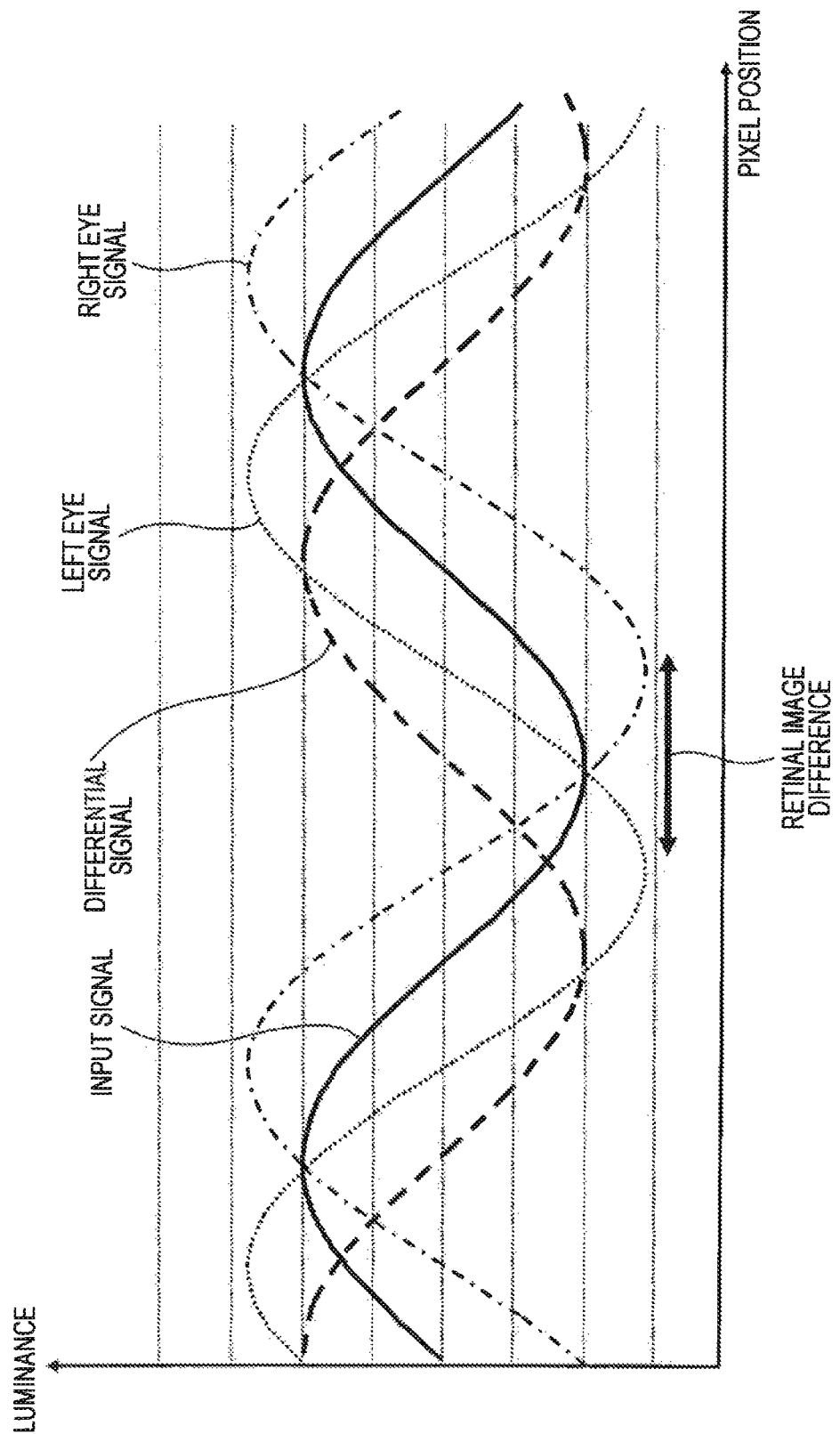
FIG. 14 is a diagram illustrating a retinal image difference between a right eye image and a left eye image generated by an image processing apparatus according to an embodiment of the present invention.

As described above, the retinal image difference is changed depending on the angular frequency ω. FIG. 14 illustrates a waveform in a case where the angular frequency of the input signal is ½, compared with the case shown in FIG. 13. As understood from the figure, the retinal image difference becomes two times larger than that of the case in FIG. 13, and thus, the images are perceived as having a far depth of field in the case of the binocular stereopsis, compared with the input signal in FIG. 13.

Figure 15:
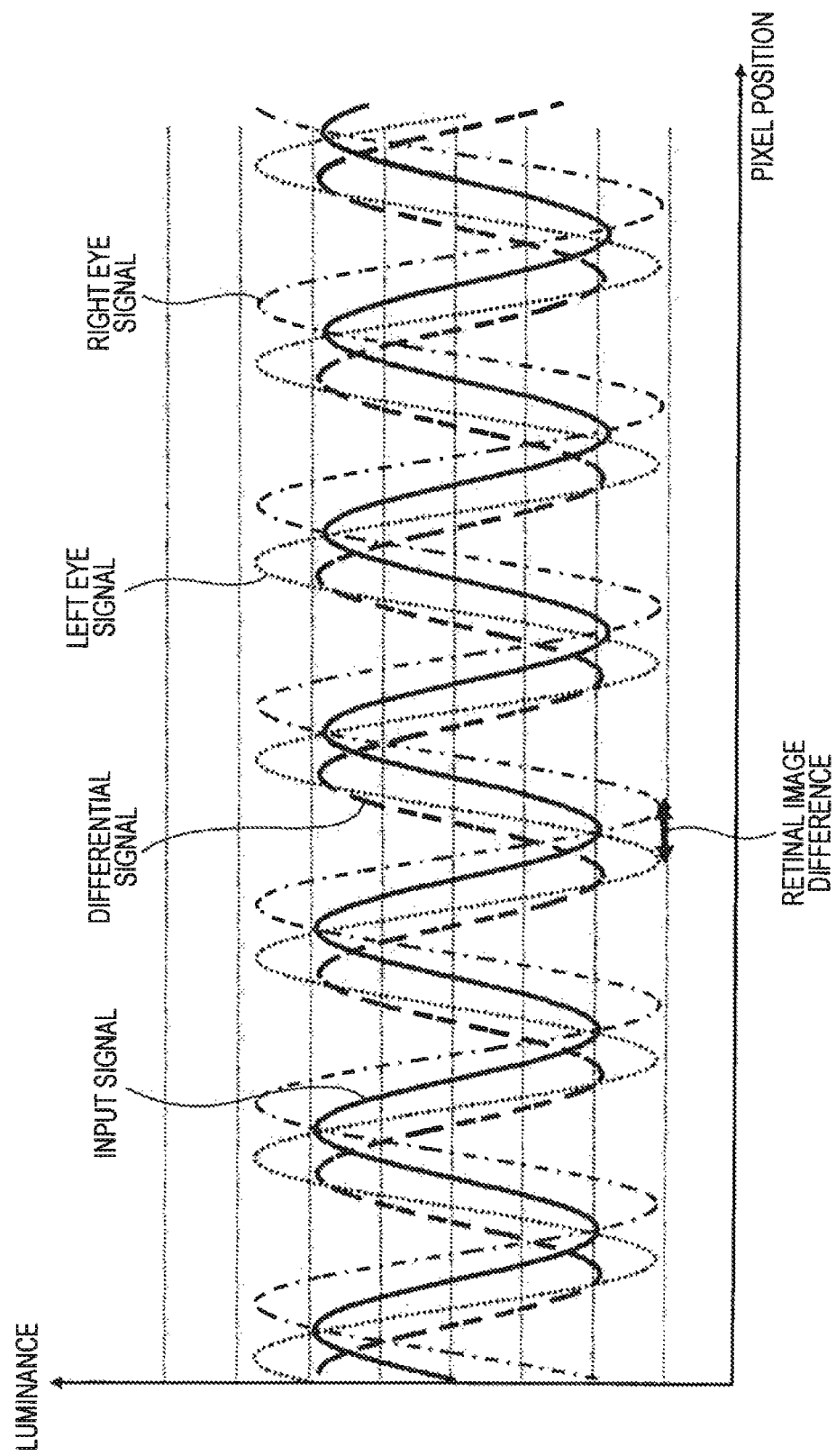
FIG. 15 is a diagram illustrating a retinal image difference between a right eye image and a left eye image generated by an image processing apparatus according to an embodiment of the present invention.

Further, FIG. 15 illustrates a waveform in a case where the angular frequency of the input signal is two times, compared with the case shown in FIG. 13. As understood from the figure, the retinal image difference is ½ of the case in FIG. 13, and the images are perceived as having a near depth of field in the case of the binocular stereopsis, compared with the input signal in FIG. 13.

Figure 16:
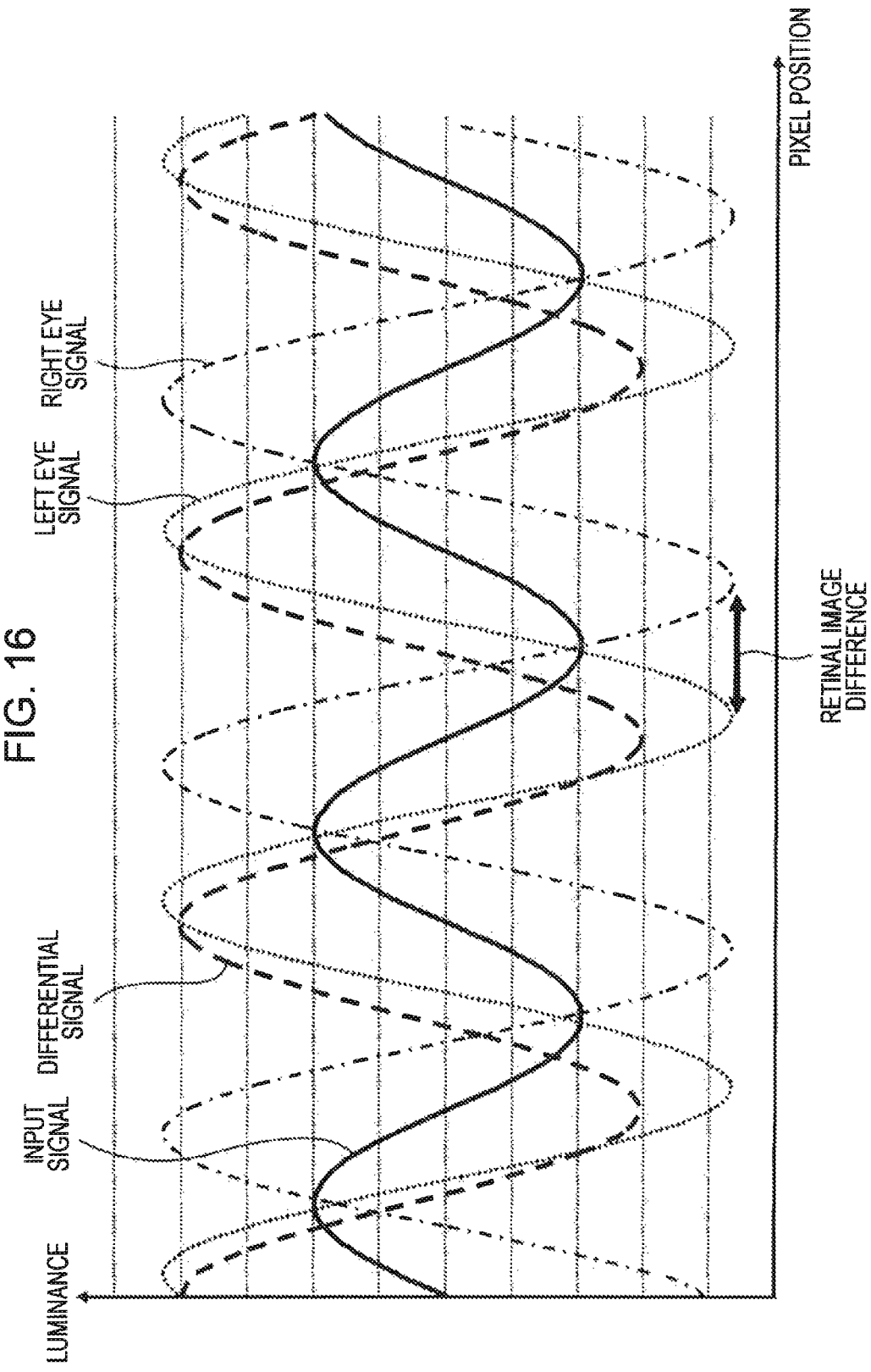
FIG. 16 is a diagram illustrating a retinal image difference between a right eye image and a left eye image generated by an image processing apparatus according to an embodiment of the present invention.

Further, a waveform in the case of controlling the amplitude of the differential signal D is shown in FIG. 16. FIG. 16 illustrates a case that the differential signal D is amplified by two times. Here, a controlled differential signal F is expressed as the following formula (formula 6) for generalization.

$F=k \cos \omega x$ (formula 6)

Here, k represents a positive real number.

F corresponds to the above-described disparity emphasis signal E generated by the conversion process for the differential signal D.

At this time, the left eye signal L and the right eye signal R are expressed as the following formula 7 and formula 8.

$L=S+F=\sin \omega x+k \cos \omega x=\sqrt{k^2} \sin(\omega x+\alpha)$ (formula 7)

$R=S-F=\sin \omega x-k \cos \omega x=\sqrt{1+k^2} \sin(\omega x-\alpha)$ (formula 8)

Here, α is in the range of 0 to π/2, and is expressed as the following formula (formula 9).

$$\alpha = \arccos \frac{1}{\sqrt{1+k^2}}$$ (formula 9)

In the formula (formula 9), if the amplified value k of the differential signal is increased, α becomes larger, and thus, the phase differences between the input signal S and the left eye signal L and between the input signal S and the right eye signal R also become larger. Accordingly, the phase difference between the left eye signal L and the right eye signal R becomes larger, and thus, the retinal image difference is perceived as large. As a result, the images are perceived as being further away in the case of the binocular stereopsis.

As described above, in the right eye image and the left eye image generated by the image processing apparatus 100 according to the present embodiment, the retinal image difference is changed according to the space frequency of the images. That is, the retinal image difference becomes small in a region having a high space frequency, and becomes large in a region having a low space frequency. In a case where these images are separately provided to a person's the right eye and the left eye, the person perceives the region having a small retinal image difference as a near side, and perceives the region having a large retinal image difference as a far side.

However, the image processing apparatus 100 of the present embodiment simply performs the process according to a local space frequency as described above, and thus, different retinal image differences are given to an edge section and a texture section for an individual object in the image. Accordingly, since the observer may be nearly unable to perceive correct depth only from the retinal image difference, the overall depth of the image may be analogically perceived by the person from image information about pictorial image characteristics (composition, anteroposterior relation of objects, and space frequency), motion parallax or the like.

Further, as described above, since the retinal image difference is mainly generated for the edge section of the image, the retinal image difference is given to minute structures such as the branches of trees, electric cables or hairs. Thus, it is possible to express the stereoscopic effect of minute objects.

The image processing apparatus according to the present embodiment simply performs a local modulation process for an image using such characteristics, to thereby realize the configuration of generating a binocular disparity image for realizing natural stereopsis.

Further, the image processing apparatus according to the present embodiment generates the right eye image (Right) and the left eye image (Left) according to the above-described (formula 1). That is, when the luminance level of the video data corresponding to the input signal is (S) and the signal level of the disparity emphasis signal for non-linearly converting the differential signal (b) shown in FIG. 8 is (E), the right eye image signal (Right) and the left eye image signal (Left) are generated according to the following formula.

Right=$S-E$  Right eye image signal:

Left=$S+E$  Left eye image signal:

As understood from the formula, an addition signal generated by adding the right eye image signal and the left eye image signal becomes as follows.

Addition signal=$(S+E)+(S-E)=S$

As a result, the addition signal becomes equivalent to the input image.

Accordingly, for example, in the case where the display is performed by the three-dimensional display apparatus of the time division type as described above with reference to FIG. 10 or FIG. 11, if the user who is the observer observes the image without the liquid crystal shutter-type glasses, an image in which the left eye image (Left) and the right eye image (Right) are integrated by a temporal integration function in a visual system of human is perceived. The image becomes the following addition signal [S].

Addition signal=$(S+E)+(S-E)=S$

That is, an input two-dimensional image can be perceived as it is. That is, the image is not observed as unnatural double images, but can be observed as an image in which no process is performed.

Further, in the case where the display is performed by the three-dimensional display apparatus of the space division type as shown in FIG. 12, if the observation is performed from such a distance that one pixel in the vertical direction is not perceived without the polarization filter, an image to which two pixels in the vertical direction are added is perceived. The image becomes the following addition signal [S].

Addition signal=$(S+E)+(S-E)=S$

On the other hand, since human eyesight for retinal image differences is ten times higher than normal eyesight, the retinal image difference between the left eye image and the right eye image can be sufficiently recognized even though they are observed from such a distance. Accordingly, the image is not observed as an unnatural double image but can be observed as an image in which no process is performed, without polarization glasses. With the polarization glasses, the three-dimensional perception can be achieved.

As described above, the image generated by the image processing apparatus according to the present embodiment is displayed using the three-dimensional display apparatus, and thus, the three-dimensional perception can be achieved with the glasses for stereopsis, and the image can be perceived as an original two-dimensional image in which the conversion is performed without the glasses for stereopsis.

Hereinbefore, in the case where the distance from the photographing position in the above-described table 1 satisfies "distance>threshold", the process for the pixel region corresponding to the formula has been described.

Next, in the case of "distance≤threshold", a process for the pixel region corresponding to the formula will be described.

As shown in the table 1, in the case of "distance from the photographing position≤threshold", the left eye image (L image) is "input signal−disparity emphasis signal" (output of subtractor), and the right eye image (R image) is "input signal+disparity emphasis signal" (output of adder), which are output as the left eye image (L image) and the right eye image (R image).

This process corresponds to a process for switching outputs of the adder 134 and the subtractor 135 by the process for switching the left eye image (L image) and the right eye image (R image) in the process in the case where the distance from the photographing position as described with reference to FIG. 8 satisfies "distance>threshold", that is, by the process of the selector 137 shown in FIG. 7.

In this case, the right eye signal (c) in FIG. 8 is switched into the left eye signal, and the left eye signal (d) in FIG. 8 is switched into the right eye signal. In FIG. 13, the left eye signal and the right eye signal are switched with each other.

As described above, the phase difference is perceived as the retinal residual difference, and thus depth is sensed. However, in this case, since the residual difference becomes the exact opposite, compared with a case where switching is not performed, the depth is reversely sensed as near in the case of having been sensed as distant, and the depth is sensed as distant in the case of having been sensed as near.

Here, a boundary in which the sensed depth is reversed becomes a pixel in which the distance from the photographing position satisfies "distance=threshold" in which the outputs of the adder 134 and the subtractor 135 are switched. That is, if the depth is perceived as a far side in the range of "distance>threshold", the depth is perceived as a near side in the range of "distance<threshold" using the value of "distance=threshold" as the boundary. Thus, it is possible to perceive a depth having a wider range, compared with the process in which the switching is not performed.

A configuration for such a perception will be described with reference to FIGS. 17 to 20.

Figure 17A:
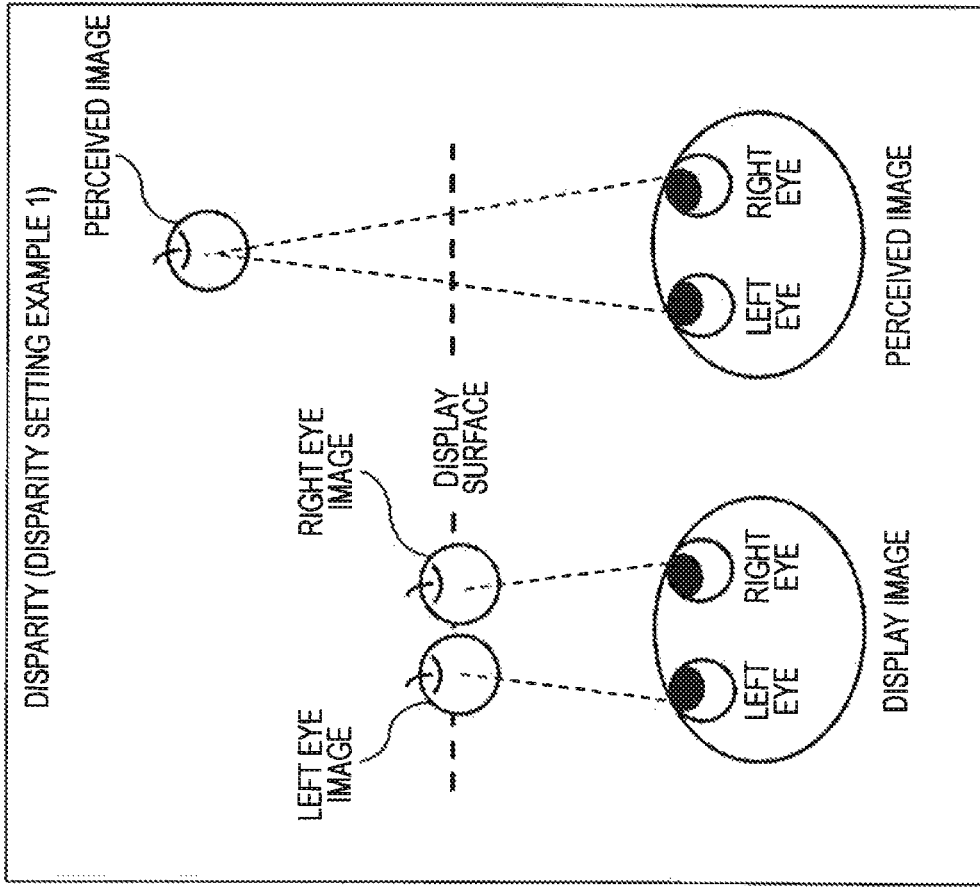
FIGS. 17A and 17B are diagrams illustrating a disparity setting and a perceived image between a right eye image and a left eye image.

As shown in FIG. 17A, in a case where a non-disparity image in which the left eye image and the right eye image coincide with each other is displayed on the display surface of the display section, the observer perceives the image on the display surface. This is the normal two-dimensional image display process.

In a case where the three-dimensional image display process is performed, the left eye image and the right eye image are shifted and displayed. That is, the image with disparity is displayed, and thus, the three-dimensional perception can be achieved.

Figure 17B:
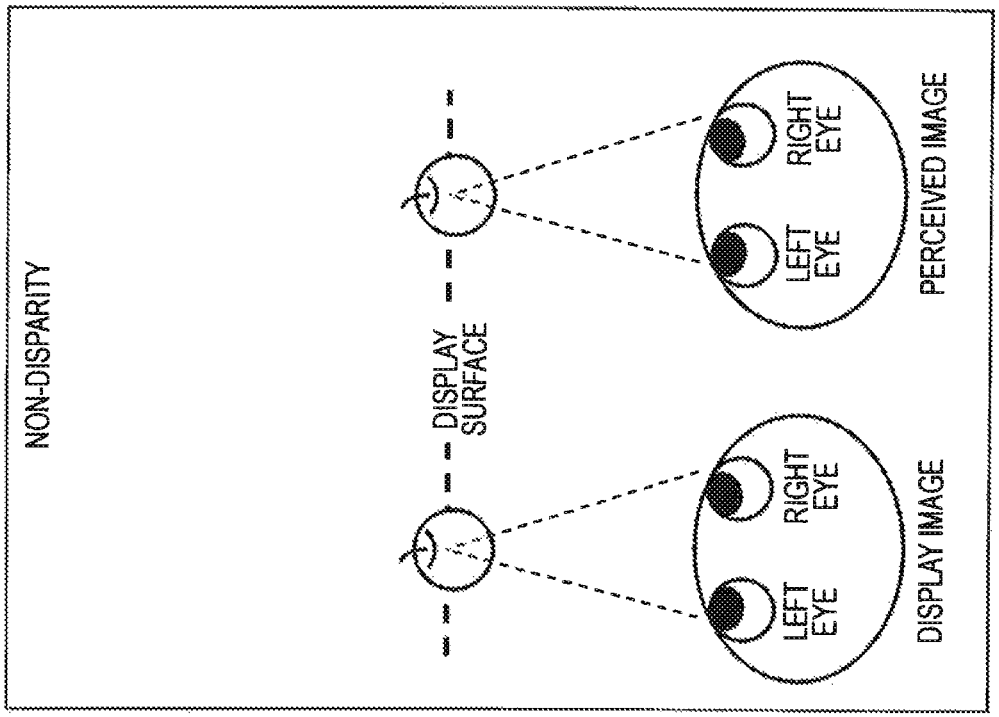
Figure 18:
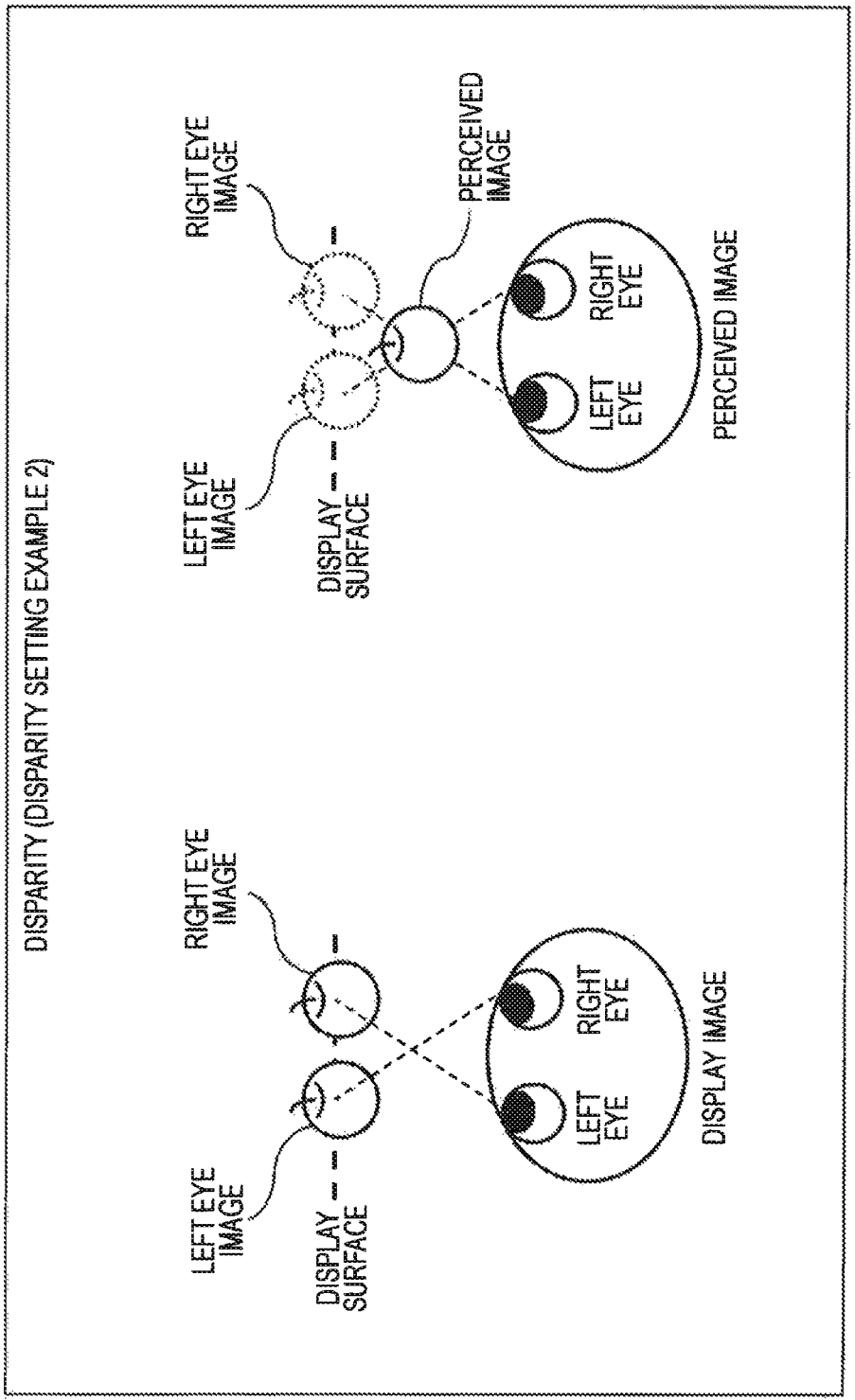
FIG. 18 is a diagram illustrating a disparity setting and a perceived image between a right eye image and a left eye image.

For the disparity setting, two different patterns of settings shown in FIGS. 17A, 17B and 18 can be employed. That is, there are two patterns of a disparity setting in FIG. 17B (disparity setting example 1) and a disparity setting in FIG. 18 (disparity setting example 2).

In the disparity setting in FIG. 17B (disparity setting example 1), as shown in the display image in FIG. 17B, the left eye image displayed on the display surface is shifted to the left side (left side viewed from the observer), and the right eye image is shifted to the right side (right side viewed from the observer). In this setting, as shown in the perceived image in FIG. 17B, the observer perceives an object corresponding to the image as existing on a rear side (far side) from the display surface.

In the disparity setting in FIG. 18 (disparity setting example 2), as shown in the display image in FIG. 18, the left eye image displayed on the display surface is shifted to the right side (right side viewed from the observer), and the right eye image is shifted to the left side (left side viewed from the observer). In this setting, as shown in the perceived image in FIG. 18, the observer perceives an object corresponding to the image as existing on a front side (near side) from the display surface.

The image processing apparatus according to the present embodiment has a configuration in which both of the disparity setting in FIG. 17B and the disparity setting in FIG. 18 are selectively applied. That is, the image synthesizing section 133 shown in FIGS. 5 and 7 switches the disparity settings according to the comparison of the distance from the photographing position and the threshold in the table 1, to thereby generate the left eye image and the right eye image.

Specifically, the process performed by the image synthesizing section 133 is as follows.

With respect to the pixel region in which the determination formula of "distance from the photographing position>threshold" is satisfied, the left eye image (L image) is "input signal+disparity emphasis signal) (output of the adder", and the right eye image (R image) is "input signal−disparity emphasis signal" (output of the subtractor), which are output as the left eye image (L image) and the right eye image (R image).

This process corresponds to the process of generating the right eye image (c) and the left eye image (d) shown in FIG. 8. This is the process corresponding to the disparity setting example 1 in FIG. 17B, and the image is perceived on a rear side (far side) from the display surface.

On the other hand, with respect to the pixel region in which the determination formula of "distance from the photographing position≤threshold" is satisfied, the left eye image (L image) is "input signal−disparity emphasis signal" (output of the subtractor), and the right eye image (R image) is "input signal+disparity emphasis signal" (output of the adder), which are output as the left eye image (L image) and the right eye image (R image).

This is the process corresponding to the disparity setting example 2 in FIG. 18, and the image is perceived on a front side (near side) of the display surface.

Figure 19:
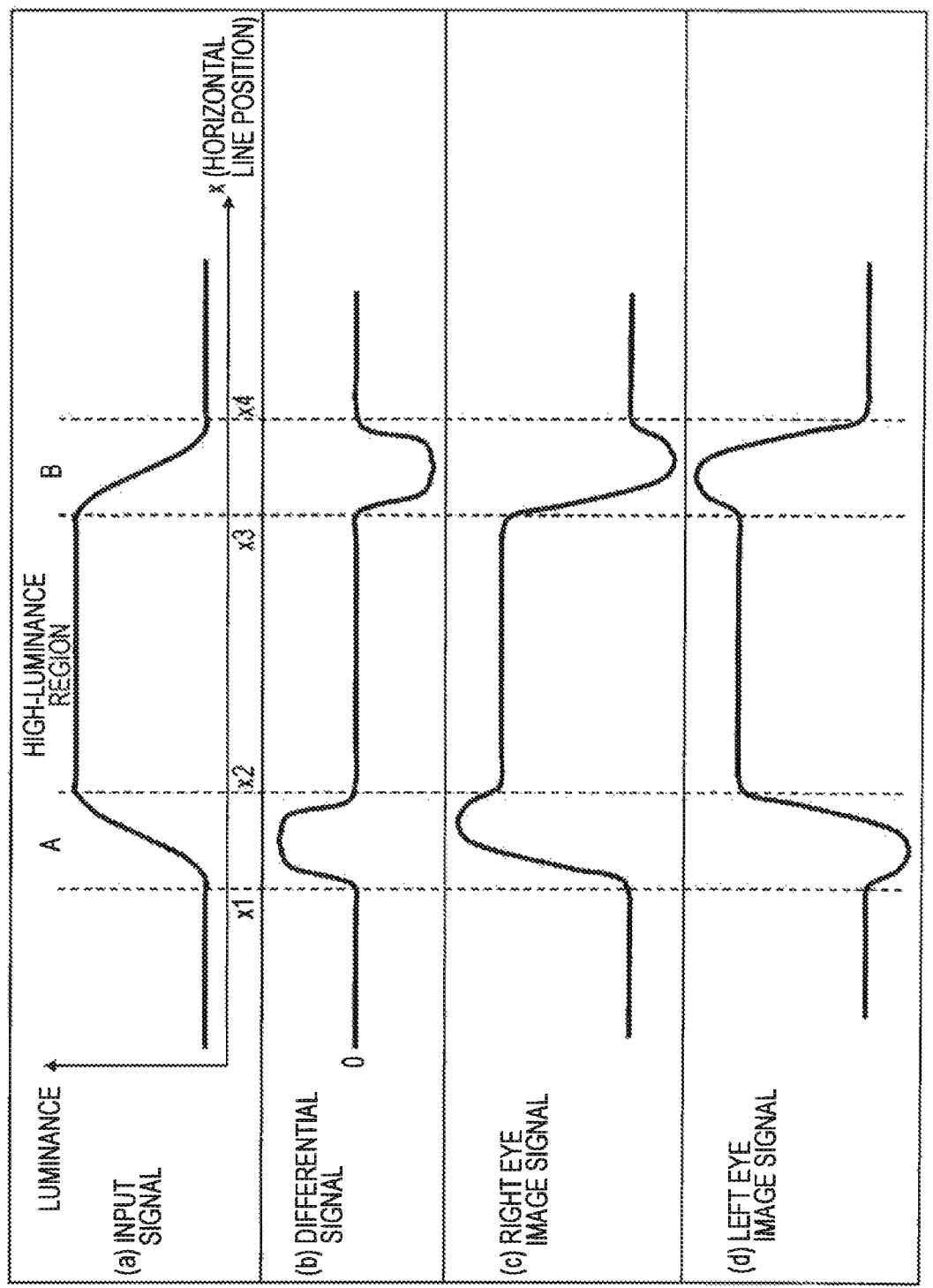
FIG. 19 is a diagram illustrating an example of an image signal generating process for the right eye and the left eye from an input image performed by an image converting section of an image processing apparatus according to an embodiment of the present invention.

In this process, the right eye image (R image) and the left eye image (L image) generated by the image synthesis process performed by the image synthesizing section 133 are set as shown in FIG. 19.

FIG. 19 illustrates similar signals to FIG. 8, that is, an input signal (a), a differential signal (b), a right eye image signal (c) and a left eye image signal (d) in the order named from the top.

The input signal (a) and the differential signal (b) are the same signals as in FIG. 8. The input signal (a) represents change in the luminance of an arbitrary one horizontal line of an arbitrary frame of video data. There is exemplified one line in which a high luminance region having a high level of luminance exists in the center area thereof. In a region A ranging from a line position (x1) to a line position (x2), the luminance is changed to gradually become high. Between the line position (x2) and a line position (x3), the high luminance region in which the high level of luminance is maintained exists. Then, in a region B ranging from the line position (x3) to a line position (x4), the luminance is changed to gradually become low.

The differential signal (b) is a result obtained by differentiating the input signal (a). The differential signal is the signal generated in the differentiator 131 of the image converting section 130 in FIG. 5.

As shown in the figure, the differential signal generated by the differentiator 131 has a positive value in the region A in which the luminance change of the input signal (a) becomes positive, and has a negative value in the region B in which the luminance change of the input signal (a) becomes negative.

The right image signal (c) and the left eye image signal (d) become signals obtained by switching the right eye image signal (c) and the left eye image signal (d) in FIG. 8, as described above.

The display process corresponding to the disparity setting example 2 in FIG. 18 is performed by applying these signals, and thus the observer perceives the image on a front side (near side) from the display surface.

As described above, the image processing apparatus according to the present embodiment selectively applies both the disparity setting in FIG. 17B and the disparity setting in FIG. 18. That is, as shown in the table 1, the right eye image signal and the left eye image signal in which the disparity settings are switched according to the comparison of the distance from the photographing position and the threshold, are generated.

A process performed by the image processing apparatus according to the present embodiment will be described with reference to FIGS. 20A, 20B and 20C as a whole. The image processing apparatus according to the present embodiment switches and uses a disparity setting example 2 in which an image is perceived on a far side from the display surface as shown in FIG. 20A and a disparity setting example 1 in which an image is perceived on a near side from the display surface as shown in FIG. 20B, according to distance information on pixels for forming the image. As a result, as shown in FIG. 20C, the observer can perceive the image in a wide range from a front side (near side) from the display surface to a rear side (far side) from the display surface, to thereby achieve a more three-dimensional perception.

Next, the sequence of a process performed by the image converting section 130 of the image processing apparatus 100 according to an embodiment of the present invention will be described with reference to a flowchart in FIG. 21. The flowchart shown in FIG. 21 illustrates a process in a case where the input image is a moving image (video data).

In step S401, the differentiator 131 (see FIG. 5) performs the differential process for a luminance signal in video data input to the image converting section 130. That is, the differential signal (b) in FIG. 8 is generated by the differential process of the input signal (a) in FIG. 8.

In step S402, the non-linear converting section 132 (see FIG. 5) performs the non-linear conversion process for the differential signal output from the differentiator 131. This non-linear conversion process is the non-linear conversion process corresponding to the graph as shown in FIG. 6, for example.

The processes in step S403 and below are performed by the image synthesizing section 133. In step S403, the controller in the image synthesizing section 133 determines whether or not to perform the synthesis of the left eye image with respect to a current input frame. This determination process is performed according to the display method of the image display apparatus output by the image processing apparatus 100 and a value of a frame counter installed in the image synthesizing section 133. The frame counter holds a value corresponding to the frame number of the input image frame.

In a case where the output method of the image display apparatus is the time division output method shown in FIG. 10, the image synthesizing section 133 determines whether or not to output the left eye image according to the value of the frame counter. That is, in the case of the time division output method shown in FIG. 10, the control is performed so that the left eye image is output in either an even frame or an odd frame. If it is determined that the left eye image is to be output according to the value of the frame counter, the procedure goes to step S404. On the other hand, if it is determined that the right eye image is to be output according to the value of the frame counter, the procedure goes to step S405.

Further, in other cases which are different from the time division output method shown in FIG. 10, that is, in the case of the time division output method using the two-time frame rate shown in FIG. 11, in the case of the space division output method shown in FIG. 12, or in a case where the left eye image and the right eye image shown in FIG. 9 are input to perform display control in the image display apparatus, the image synthesizing section 133 determines that the left eye images are synthesized for all the input frames, and then the procedure goes to step S404.

Figure 22:
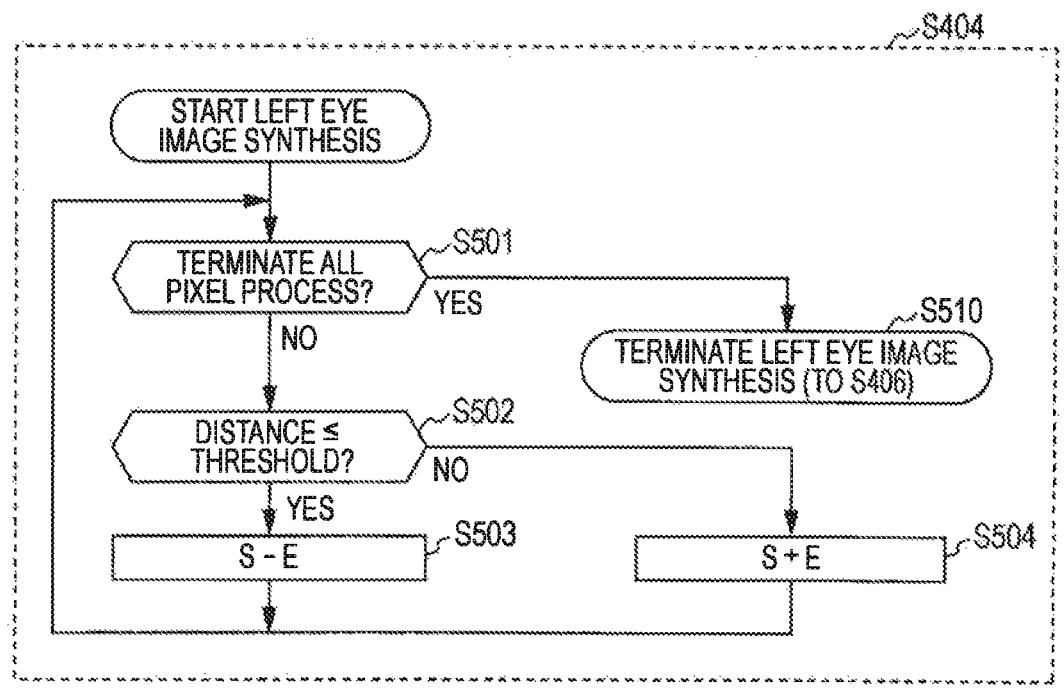
FIG. 22 is a flowchart illustrating a generating process sequence of a left eye image performed by an image converting section of an image processing apparatus according to an embodiment of the present invention.

In step S404, the image synthesizing section 133 generates the left eye image (Left). FIG. 22 illustrates a detailed flow of the generation process of the left eye image (Left) in step S404. The image synthesizing section 133 generates the left eye image (Left) according to the table 1 as described above.

That is, the distance from the photographing position is compared with the preset threshold in the unit of each pixel or in preset region units, to thereby generate the left eye image (Left) according to the comparison result as follows.

In the case of "distance from the photographing position≤threshold", the left eye image (L image) is generated as "input signal−disparity emphasis signal", and in the case of "distance from the photographing position>threshold", the left eye image (L image) is generated as "input signal+disparity emphasis signal", through these processes.

Details of the generation process of the left eye image (Left) in step S404 will be described with reference to a flowchart in FIG. 22. Firstly, in step S501, it is determined whether the generation process of the left eye image (Left) is terminated for each pixel. If it is determine that the process is terminated for the all pixels, the procedure goes to step S510. Then, the step S404 is terminated, and then the procedure goes to step S406 in FIG. 21.

In step S501, if it is determined that the generation process of the left eye image (Left) has an unprocessed pixel, the procedure goes to step S502.

In step S502, the distance from the photographing position is compared with the preset threshold in the pixel unit or the preset region unit.

In step S502, if it is determined that the determination formula of "distance from the photographing position≤threshold" is satisfied (Yes in step S502), the procedure goes to step S503.

In step S503, the left eye image is generated according to the formula, that is, "left eye image (L image)=input signal (S)−disparity emphasis signal (E)".

The calculation formula corresponds to a process in which the selector 137 of the image synthesizing section 133 shown in FIG. 7 selects the output of the subtractor 135 and outputs it as the left eye image (L image).

On the other hand, in step S502, if it is determined that the determination formula of "distance from the photographing position≤threshold" is not satisfied (No in step S502), the procedure goes to step S504.

In step S504, the left eye image is generated according to the formula, that is, "left eye image (L image)=input signal (S)+disparity emphasis signal (E)".

The calculation formula corresponds to a process in which the selector 137 of the image synthesizing section 133 shown in FIG. 7 selects the output of the adder 134 and outputs it as the left eye image (L image).

On the other hand, in step S403 shown in FIG. 21, if it is determined that the left eye image is not synthesized for the current input frame, the procedure goes to step S405, and the right eye image is generated for the current input frame.

Figure 23:
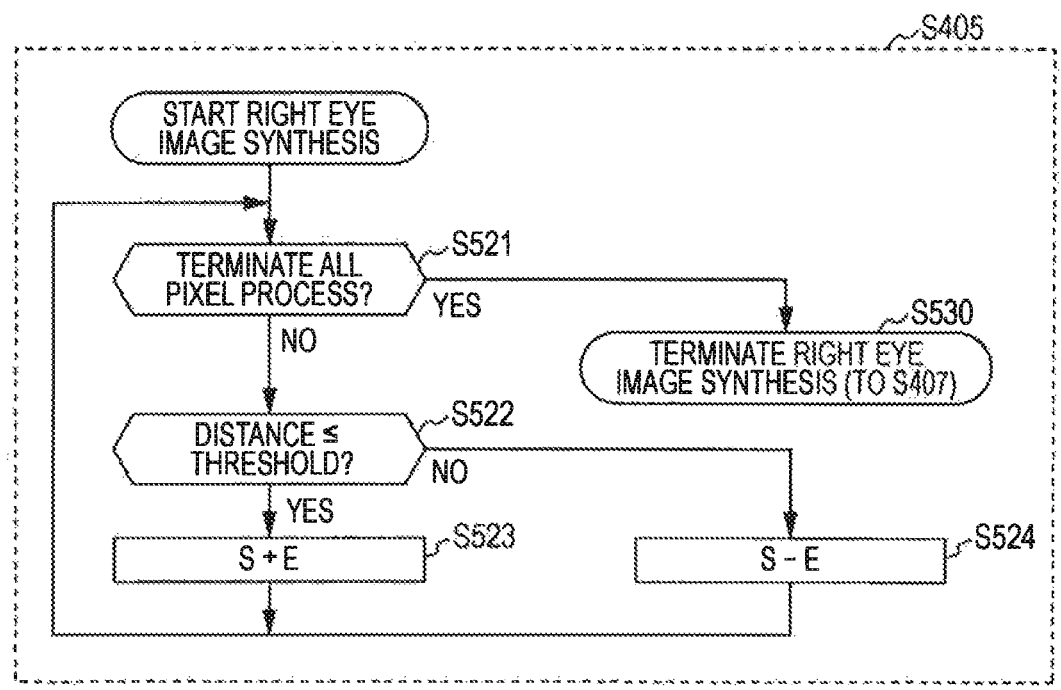
FIG. 23 is a flowchart illustrating a generating process sequence of a right eye image performed by an image converting section of an image processing apparatus according to an embodiment of the present invention.

In step S405, the image synthesizing section 133 generates the right eye image (Right). FIG. 23 illustrates a detailed flow of the generation process of the right eye image (Right) in step S405. The image synthesizing section 133 generates the right eye image (Right) according to the table 1 as described above.

That is, the distance from the photographing position is compared with the preset threshold in the pixel unit or the preset region unit, to thereby generate the right eye image (Right) according to the comparison result, as follows.

In the case of "distance from the photographing position≤threshold", the right eye image (R image) is generated as "input signal+disparity emphasis signal", and in the case of "distance from the photographing position>threshold", the right eye image (R image) is generated as "input signal–disparity emphasis signal", through these processes.

Details of the generation process of the right eye image (Right) in step S405 will be described with reference to a flowchart in FIG. 23. Firstly, in step S521, it is determined whether the generation process of the right eye image (Right) is terminated for each pixel. If it is determined that the process is terminated for the all pixels, the procedure goes to step S530. Then, the step S405 is terminated, and then the procedure goes to step S407 in FIG. 21.

In step S521, if it is determined that the generation process of the right eye image (Right) has an unprocessed pixel, the procedure goes to step S522.

In step S522, the distance from the photographing position is compared with the preset threshold in the pixel unit or the preset region unit.

In step S522, if it is determined that the determination formula of "distance from the photographing position≤threshold" is satisfied (Yes in step S522), the procedure goes to step S523.

In step S523, the right eye image is generated according to the formula, that is, "right eye image (R image) input signal (S)+disparity emphasis signal (E)".

The calculation formula corresponds to a process in which the selector 137 of the image synthesizing section 133 shown in FIG. 7 selects the output of the adder 134 and outputs it as the right eye image (R image).

On the other hand, in step S522, if it is determined that the determination formula of "distance from the photographing position≤threshold" is not satisfied (No in step S522), the procedure goes to step S524.

In step S524, the right eye image is generated according to the formula, that is, "right eye image (R image)=input signal (S)−disparity emphasis signal (E)".

The calculation formula corresponds to a process in which the selector 137 of the image synthesizing section 133 shown in FIG. 7 selects the output of the subtractor 135 and outputs it as the right eye image (R image).

Further, if the generation of the left eye image is terminated in step S404 in FIG. 21, it is determined whether the right eye image is also generated for the same frame as the generation frame of the left eye image in step S406. In a case where the output method of the image processing apparatus is the time division output method shown in FIG. 10, since only one of the left eye image and the right eye image is synthesized in each frame, it is determined that the right eye image is not generated, and the procedure goes to step S407.

Further, in other cases which are different from the time division output method shown in FIG. 10, that is, in the case of the time division output method using the two-time frame rate shown in FIG. 11, in the case of the space division output method shown in FIG. 12, or in a case where the left eye image and the right eye image shown in FIG. 9 are input to perform display control in the image display apparatus, the image synthesizing section 133 determines that the right eye images are synthesized for all the input frames, and then the procedure goes to step S405. The process in step S405 is the same as described above, which corresponds to the generation process of the right eye image according to the table 1.

In step S407, the controller of the image synthesizing section 133 determines whether or not to perform a reduction process for the image. In a case where the output format of the image processing apparatus is the space division output method shown in FIG. 12, it is determined to perform the image reduction process, and then the procedure goes to step S408. In a case where the output format of the image processing apparatus is different from the space division output method shown in FIG. 12, that is, in the case of any one of the methods of simultaneously outputting the left eye image and the right eye image shown in FIG. 9, the time division output method shown in FIG. 10, and the time division output method using the two-time frame rate shown in FIG. 11, the image reduction process is unnecessary, and thus the procedure goes to step S410.

In steps S408 and S409, the image synthesizing section 133 generates the binocular disparity image (e) shown in FIG. 12, as described with reference to FIG. 12, from the right eye image (c) and the left eye image (d). That is, the phase of each of the right eye image (c) and the left eye image (d) is shifted by one line to perform the reduction process to ½ in the vertical direction (S408). Further, the image synthesizing section 133 alternately synthesizes the left eye image and the right eye image obtained in this manner in the unit of horizontal lines to generate one sheet of binocular disparity image (d) (S409).

In step S410, it is determined whether the image output process in the image output section 150 is terminated. In a case where the image output process is terminated, the image conversion process is terminated. In a case where the image output process is not terminated, the procedure goes to step S411.

In step S411, the frame count is incremented, and then the procedure goes to step S401. Thereafter, the processes of steps S401 to S410 are repeated.

Hereinbefore, the example in which the right eye image and the left eye image are generated using the input signal (S) and the disparity emphasis signal (E) has been described with reference to FIGS. 21 to 23. However, as described with reference to FIG. 5, the present embodiment may have a configuration in which the conversion process of the non-linear converting section 132 is omitted, the differential signal generated by the differentiator 131 is directly input to the image synthesizing section 133 (dashed line in FIG. 5), and thus, the image synthesizing section 133 generates the left eye image and the right eye image using the differential signal. In this case, the disparity emphasis signal (E) is replaced by the differential signal.

As described above, according to the image processing apparatus according to an embodiment of the invention, the edge section which is the characteristic amount of the image, that is, the luminance change section of the image is extracted on the basis of the input two-dimensional image data, and the image pattern of the edge section is changed, to thereby generate the pseudo right and left eye images. With such a configuration, it is possible to generate a preferable binocular disparity image in the three-dimensional display apparatus.

Further, in the image processing apparatus according to the present embodiment, as described above with reference to the table 1, using the input signal (S) and the disparity emphasis signal (E), the right eye image signal and the left eye image signal are generated according to the following formulas.

In the case of the pixel region in which the determination formula of "distance from the photographing position-≤threshold" is satisfied, the formulas are as follows.

Left=$S$−$E$   Left eye image signal:

Right=$S$+$E$   Right eye image signal:

In the case of the pixel region in which the determination formula of "distance from the photographing position>threshold" is satisfied, the formulas are as follows.

Left=S+E            Left eye image signal:

Right=S−E           Right eye image signal:

As understood from the generation formulas of the left eye image signal and the right eye image signal, an addition signal generated by adding the right eye image and the left eye image signal is as follows.

Addition signal=(S+E)+(S−E)=S

As obvious from the formula, the addition signal is equivalent to the input image.

In this way, the addition signal is set to be equivalent or approximately equivalent to the input signal. Accordingly, when the user views the image displayed on the three-dimensional display apparatus, the user can perceive the three-dimensional expression with the glasses for stereopsis, and can perceive the image as a normal two-dimensional image without the glasses for stereopsis. That is, regardless of the presence or absence of the glasses, the user can enjoy the image. Further, according to the image converting apparatus according to the present embodiment, the disparity of the left eye image and the right eye image is very small, to thereby making it possible to decrease the degree of fatigue of the user using the glasses for stereopsis.

Figure 24:
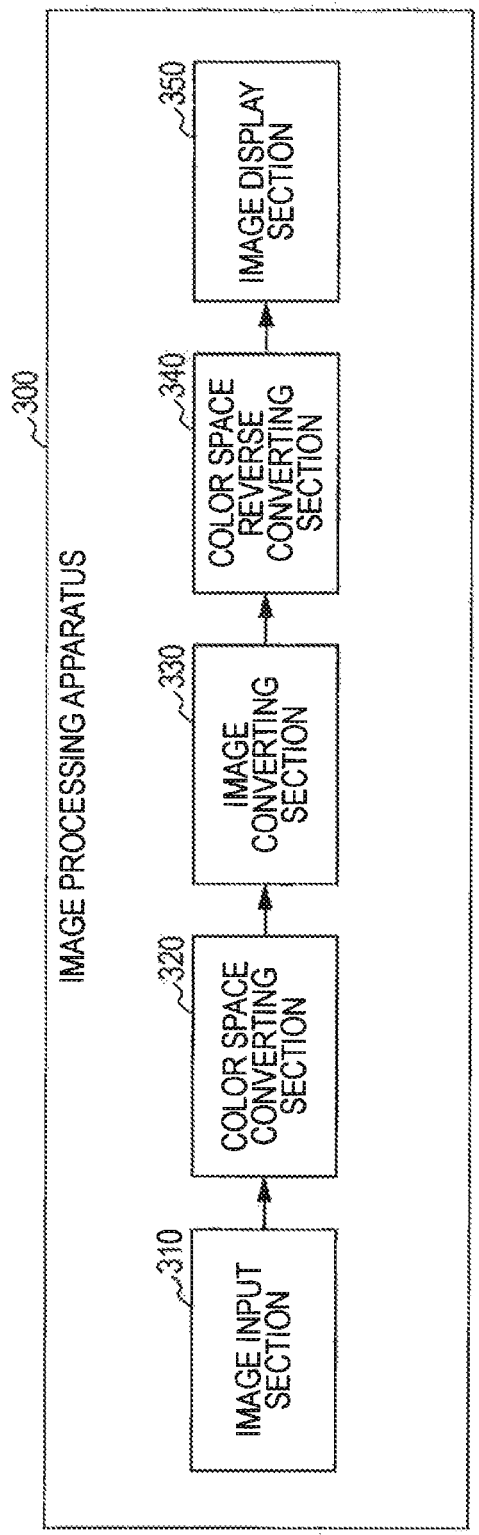
FIG. 24 is a diagram illustrating a configuration example of an image processing apparatus according to an embodiment of the present invention.

The image processing apparatus shown in FIG. 1 has been described as an image processing apparatus which does not have the image display section. However, the image processing apparatus may be provided as an image processing apparatus having the image display section. FIG. 24 is a diagram illustrating an embodiment of the image processing apparatus having the image display section.

An image display apparatus 300 receives a still image file output from a digital still camera or the like, or moving image data output from a camcorder or the like, and then converts the received file or data into an internal data format, in an image input section 310. Here, the internal data format refers to baseband moving image data, which is video data of three primary colors of red (R), green (C) and blue (B) or video data of luminance (Y) and color difference (Cb, Cr). The internal data format may have any color space as long as color space identifying signals are overlapped and a color space converting section 32 in a subsequent stage corresponds thereto.

The video data output from the image input section 310 is input to the color space converting section 320, and is converted into a luminance signal and a color difference signal. At this time, in a case where the input video data is based on Y, Cb and Cr color spaces, the color space converting section 320 outputs the video data without conversion into the color spaces. In a case where the input video data is based on the R, C and B color spaces, or other color spaces, the color space converting section 320 converts the video data into the luminance (Y) and color difference (Cb, Cr) signals for output.

In this respect, the color spaces of the video data output from the color space converting section 320 are not limited to the Y, Cb and Cr spaces, but may be any spaces as long as the color spaces allows a luminance component and a color component to be separated from each other.

The video data output from the color space converting section 320 is input to an image converting section 330. The image converting section 330 generates binocular disparity images for the left eye and the right eye through the process as described above, and synthesizes and outputs the images according to the format of the image display section 350.

The video data output from the image converting section 330 is input to a color space reverse converting section 340, and is converted into the R, G and B color spaces from the Y, Cb and Cr color spaces.

The video data output from the color space reverse converting section 340 is input to an image display section 350. The image display section 350 is configured to serve as an image output section and a display section, and performs image display according to any three-dimensional display method time division method or space division method) as follows.

(Time Division Type)

In the three-dimensional display method of the space division type, an odd frame and an even frame of input video data are recognized as a left eye image and a right eye image (or the right eye image and the left eye image), respectively, and the images are temporally and alternately provided to the left eye and the right eye by controlling the liquid crystal shutter-type glasses which a user wears. In this display type, the image display section 350 performs control so that an output switching timing of the left eye image and the right eye image is synchronized with shutter switching of left and right glasses sections of the glasses used by the observer.

(Space Division Type)

In the three-dimensional display method of the space division type, in a case where a polarization filter which is set so that the polarizing direction becomes different for every horizontal line is installed on a front display surface and the user uses the glasses of the polarizing filter type, the images are separated and provided to the left eye and the right eye for every horizontal line.

As described above, according to the image processing apparatus of the present embodiment, the right eye image and the left eye image are generated from the characteristic amount of the image in a pseudo manner on the basis of the input two-dimensional image data, and thus, the three-dimensional display can be performed using the binocular disparity. Further, according to the image processing apparatus of the present embodiment, the images are converted to be equivalent to the input image when the left eye image and the right eye image are added, and thus, it is possible to perceive the three-dimensional expression with the glasses for stereopsis, and to perceive the images as the usual two-dimensional image without the glasses for stereopsis. Thus, the user can enjoy the image regardless of the presence or absence of the glasses. Further, according to the image display apparatus of the present embodiment, the disparity of the left eye image and the right eye image is very small, and thus the degree of fatigue when the user uses the glasses for stereopsis can be reduced.

Hereinbefore, the invention has been described with reference to the specific embodiments. However, it is obvious that those skilled in the art can make modifications or substitutions of the embodiments without departing from the spirit of the invention. That is, the invention should not be interpreted to be limited to the exemplary embodiments. The scope of the invention should be defined with reference to the accompanying claims.

Further, the series of processes described in the above description may be performed by hardware, software or a combination thereof. In the case where the process is performed by the software, a program in which a process sequence is recorded may be installed and executed in a memory in a computer which is assembled in specially used hardware, or may be installed and executed in a generalpurpose computer which is capable of performing a variety of processes. For example, the program may be recorded in a recording medium in advance. The program may be installed to the computer from a recording medium, may be received through a network such as LAN (Local Area Network) or the Internet, or may be installed in a recording medium such as a built-in hard disc.

The variety of processes as described above may be performed in the described order in a time series manner, or may be performed in parallel or individually according to a processing ability of a processing apparatus or as necessary. Further, the system in the embodiments has a configuration that a plurality of apparatuses is logically combined, and is not limited to a configuration that respective apparatuses are installed inside of the same casing.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    an image converting section configured to
        generate a first image and a second image through an image conversion process in which a characteristic amount is applied, and
        perform the image conversion process of a type determined according to a comparison result of distance information of a preset region unit in a two-dimensional image signal and a predetermined threshold,
    wherein the image converting section is configured to generate a first converted signal as the first image and a second converted signal as the second image,
    wherein the first converted signal is obtained by adding the characteristic amount to the two-dimensional image signal and the second converted signal is obtained by subtracting the characteristic amount from the two-dimensional image signal in a first determined type of the image conversion process,
    wherein the first converted signal is obtained by subtracting the characteristic amount from the two-dimensional signal and the second converted signal is obtained by adding the characteristic amount to the two-dimensional image signal in a second determined type of the image conversion process,
    wherein the first image and the second image are configured to be synthesized in order to generate a binocular disparity image to be separately displayed to respective eyes of an image observer, and
    wherein the image converting section is implemented via at least one processor.

2. The image processing apparatus according to claim 1, wherein the image converting section is further configured to generate the first image by adding the characteristic amount to the two-dimensional image signal when the second image is generated by subtracting the characteristic amount from the two-dimensional image signal, and to generate the first image by subtracting the characteristic amount from the two-dimensional image signal when the second image is generated by adding the characteristic amount to the two-dimensional image signal.

3. The image processing apparatus according to claim 2, wherein the image converting section is further configured to extract a luminance differential signal of the two-dimensional image signal, to set a signal generated by non-linearly converting the luminance differential signal as the characteristic amount, and to generate each one of the first image and the second image by adding the characteristic amount to the two-dimensional signal or subtracting the characteristic amount from the two-dimensional image signal.

4. The image processing apparatus according to claim 1, wherein the image converting section is further configured to switch to the image conversion process of a different type of generating the first image and the second image by adding the characteristic amount to the two-dimensional image signal and subtracting the characteristic amount from the two-dimensional image signal according to a change in the comparison result of the distance information of the preset region unit in the two-dimensional image signal and the predetermined threshold.

5. The image processing apparatus according to claim 4, wherein the image converting section is further configured to generate the first image by subtracting the characteristic amount from the two-dimensional image signal and to generate the second image by adding the characteristic amount to the two-dimensional image signal when the comparison result indicates that the distance information is less than or equal to the predetermined threshold, and to generate the first image by adding the characteristic amount to the two-dimensional image signal and to generate the second image by subtracting the characteristic amount from the two-dimensional image signal when the comparison result indicates that the distance information is greater than the predetermined threshold.

6. The image processing apparatus according to claim 4, wherein the image converting section is further configured to switch an addition process and a subtraction process applied to the two-dimensional image signal according to the comparison result, and to generate the first image and the second image in which a perception range is enlarged to anteposterior regions of a display section.

7. The image processing apparatus according to claim 1, wherein the image converting section is further configured to generate the first image and the second image for each frame forming a moving image.

8. The image processing apparatus according to claim 7, further comprising an image output section,
    wherein the image output section is configured to output the first image and the second image generated by the image converting section,
    wherein the image output section is further configured to alternately output the first image and the second image generated by the image converting section at a speed two times faster than a frame rate of the two-dimensional image signal, and
    wherein the image output section is implemented via at least one processor.

9. The image processing apparatus according to claim 1, wherein the image converting section is further configured to alternately generate only one image selected from the first image and the second image for each frame forming a moving image.

10. The image processing apparatus according to claim 1, wherein the image converting section is further configured to generate the first image and the second image for each frame forming a moving image in order to generate the binocular disparity image by alternately including line data forming the first image and the second image generated by the image converting section.

11. The image processing apparatus according to claim 1, wherein the image converting section is further configured to generate the first image and the second image so that an addition signal of the first image and second image is set to be equivalent or approximately equivalent to the two-dimensional image signal.

12. The image processing apparatus according to claim 1, further comprising an image display section configured to display the first image and the second image generated by the image converting section,
wherein the image display section is implemented via at least one processor.

13. The image processing apparatus according to claim 12,
wherein the image display section is further configured to perform a three-dimensional display process using a time-division type in which the first image and the second image are alternately output.

14. The image processing apparatus according to claim 13,
wherein the image display section is further configured to perform display switching so that an output switching timing of the first image and the second image is synchronized with shutter switching of left and right glasses sections of glasses configured to be worn by the image observer, when performing the three-dimensional display process using the time-division type in which the first image and the second image are alternately output.

15. The image processing apparatus according to claim 12,
wherein the image display section has a configuration in which a polarizing filter which is set so that a polarization direction becomes different for every horizontal line is installed on a front surface of the display section, and
wherein the image display section is further configured to display the binocular disparity image alternately including line data forming the first image and the second image generated by the image converting section.

16. An image processing apparatus comprising:
an image input section through which a two-dimensional image signal is input;
an image converting section configured to
generate a first image and a second image through an image conversion process in which a characteristic amount of the two-dimensional image signal is applied, and
perform the image conversion process of a type determined according to a comparison result of distance information of a preset region unit in the two-dimensional image signal and a predetermined threshold,
wherein the image converting section is configured to generate a first converted signal as the first image and a second converted signal as the second image,
wherein the first converted signal is obtained by adding the characteristic amount to the two-dimensional image signal and the second converted signal is obtained by subtracting the characteristic amount from the two-dimensional image signal in a first determined type of the image conversion process,
wherein the first converted signal is obtained by subtracting the characteristic amount from the two-dimensional signal and the second converted signal is obtained by adding the characteristic amount to the two-dimensional image signal in a second determined type of the image conversion process,
wherein the image converting section is further configured to generate the first image and the second image so that an addition signal of the first image and the second image is set to be equivalent or approximately equivalent to the two-dimensional image signal,
wherein the first image and the second image are configured to be synthesized in order to generate a binocular disparity image to be separately displayed to respective eyes of an image observer, and
wherein the image input section and the image converting section are each implemented via at least one processor.

17. An image processing method, executed via at least one processor, the method comprising:
generating a first image and a second image through an image conversion process in which a characteristic amount is applied; and
performing the image conversion process of a type determined according to a comparison result of distance information of a preset region unit in a two-dimensional image signal and a predetermined threshold,
wherein a first converted signal is generated as the first image and a second converted signal is generated as the second image,
wherein the first converted signal is obtained by adding the characteristic amount to the two-dimensional signal and the second converted signal is obtained by subtracting the characteristic amount from the two-dimensional image signal in a first determined type of the image conversion process,
wherein the first converted signal is obtained by subtracting the characteristic amount from the two-dimensional signal and the second converted signal is obtained by adding the characteristic amount to the two-dimensional image signal in a second determined type of the image conversion process, and
wherein the first image and the second image are configured to be synthesized in order to generate a binocular disparity image to be separately displayed to respective eyes of an image observer.

18. A non-transitory computer-readable medium having embodied thereon a program, which when executed by a computer, causes the computer to execute a method, the method comprising:
generating a first image and a second image through an image conversion process in which a characteristic amount is applied; and
performing the image conversion process of a type determined according to a comparison result of distance information of a preset region unit in a two-dimensional image signal and a predetermined threshold,
wherein a first converted signal is generated as the first image and a second converted signal is generated as the second image,
wherein the first converted signal is obtained by adding the characteristic amount to the two-dimensional signal and the second converted signal is obtained by subtracting the characteristic amount from the two-dimensional image signal in a first determined type of the image conversion process,
wherein the first converted signal is obtained by subtracting the characteristic amount from the two-dimensional signal and the second converted signal is obtained by adding the characteristic amount to the two-dimensional image signal in a second determined type of the image conversion process, and wherein the first image and the second image are configured to be synthesized in order to generate a binocular disparity image to be separately displayed to respective eyes of an image observer.

19. The image processing apparatus according to claim 1, wherein the binocular disparity image is configured to be displayed as a left eye image and a right eye image.

* * * * *